US 7,761,789 B2

(12) United States Patent
Erol et al.

(10) Patent No.: US 7,761,789 B2
(45) Date of Patent: Jul. 20, 2010

(54) METHODS FOR COMPUTING A NAVIGATION PATH

(75) Inventors: Berna Erol, San Jose, CA (US); Kathrin Berkner, Los Altos, CA (US); Siddharth Joshi, Stanford, CA (US); Edward L. Schwartz, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1225 days.

(21) Appl. No.: 11/332,533

(22) Filed: Jan. 13, 2006

(65) Prior Publication Data
US 2007/0168852 A1    Jul. 19, 2007

(51) Int. Cl.
*G06F 17/00* (2006.01)
(52) U.S. Cl. .................................. 715/249; 715/201
(58) Field of Classification Search ............... 715/249, 715/201, 202, 203, 204, 243
See application file for complete search history.

(56) References Cited

U.S. PATENT DOCUMENTS

| 5,495,567 | A |   | 2/1996  | Iizawa et al. |
|-----------|---|---|---------|---------------|
| 5,619,594 | A |   | 4/1997  | Melen |
| 5,625,767 | A |   | 4/1997  | Bartell et al. |
| 5,761,485 | A |   | 6/1998  | Munyan |
| 5,781,773 | A |   | 7/1998  | Vanderpool et al. |
| 5,781,879 | A |   | 7/1998  | Arnold et al. |
| 5,892,507 | A |   | 4/1999  | Moorby et al. |
| 5,897,644 | A |   | 4/1999  | Nielsen |
| 5,903,904 | A |   | 5/1999  | Peairs |
| 5,960,126 | A |   | 9/1999  | Nielsen et al. |
| 5,963,966 | A |   | 10/1999 | Mitchell et al. |
| 6,018,710 | A |   | 1/2000  | Wynblatt et al. |
| 6,043,802 | A |   | 3/2000  | Gormish |
| 6,044,348 | A | * | 3/2000  | Imade et al. ................ 704/278 |
| 6,141,452 | A |   | 10/2000 | Murao |

(Continued)

FOREIGN PATENT DOCUMENTS

EP       1 560 127 A2     8/2005

(Continued)

OTHER PUBLICATIONS

Lam, H., et al, "Summary Thumbnails: Readable Overviews for Small Screen Web Browsers", CHI 2005. Conference Proceedings, Conference on Human Factors in Computing Systems, Portland, OR, Apr. 2-7, 2005, pp. 1-10, XP002378456, ISBN: 1-58113-998-5.*

(Continued)

*Primary Examiner*—Laurie Ries
(74) *Attorney, Agent, or Firm*—Blakely, Sokoloff, Taylor & Zafman LLP

(57) ABSTRACT

A method, apparatus and article of manufacture for creating visualizations of documents are described. In one embodiment, the method comprises receiving audible, visual, and audiovisual document elements, computing time attributes associated with the audible, visual, and audiovisual document elements based on display and application constraints, computing information content attributes associated with the audible, visual, and audiovisual document elements based on display and application constraints, selecting a set of one or more of the audible, visual and audiovisual document elements for inclusion into a multimedia representation based on the time and information content attributes, and composing the multimedia representation using the set of one or more of the audible, visual and audiovisual document elements.

34 Claims, 8 Drawing Sheets

U.S. PATENT DOCUMENTS

| | | | |
|---|---|---|---|
| 6,144,974 | A | 11/2000 | Gartland |
| 6,173,286 | B1 | 1/2001 | Guttman et al. |
| 6,178,272 | B1 | 1/2001 | Segman |
| 6,236,987 | B1 | 5/2001 | Horowitz et al. |
| 6,249,808 | B1 | 6/2001 | Seshadri |
| 6,317,164 | B1 | 11/2001 | Hrusecky et al. |
| 6,349,132 | B1 | 2/2002 | Wesemann et al. |
| 6,377,704 | B1 | 4/2002 | Cooperman |
| 6,598,054 | B2 | 7/2003 | Schuetze et al. |
| 6,665,841 | B1 | 12/2003 | Mahoney et al. |
| 6,704,024 | B2 | 3/2004 | Robotham et al. |
| 6,747,648 | B2 | 6/2004 | Hoehn et al. |
| 6,778,970 | B2 | 8/2004 | Au |
| 6,788,347 | B1 | 9/2004 | Kim et al. |
| 6,804,418 | B1 | 10/2004 | Yu et al. |
| 6,862,713 | B1 | 3/2005 | Kraft et al. |
| 6,873,343 | B2 | 3/2005 | Chui |
| 6,924,904 | B2 | 8/2005 | Stevens et al. |
| 6,970,602 | B1 * | 11/2005 | Smith et al. ............. 382/232 |
| 7,010,746 | B2 | 3/2006 | Purvis |
| 7,020,839 | B1 | 3/2006 | Hosoda |
| 7,035,438 | B2 | 4/2006 | Harrington et al. |
| 7,069,506 | B2 | 6/2006 | Rosenholtz et al. |
| 7,107,525 | B2 | 9/2006 | Purvis |
| 7,151,547 | B2 | 12/2006 | Lin et al. |
| 7,171,617 | B2 | 1/2007 | Harrington et al. |
| 7,177,488 | B2 | 2/2007 | Berkner et al. |
| 7,203,902 | B2 | 4/2007 | Balinsky |
| 7,263,659 | B2 | 8/2007 | Hull et al. |
| 7,272,258 | B2 | 9/2007 | Berkner et al. |
| 7,272,791 | B2 | 9/2007 | Sahuc et al. |
| 7,330,608 | B2 | 2/2008 | Berkner et al. |
| 7,383,505 | B2 * | 6/2008 | Shimizu et al. ............. 715/210 |
| 7,428,338 | B2 | 9/2008 | Berkner et al. |
| 7,434,159 | B1 | 10/2008 | Lin |
| 7,487,445 | B2 | 2/2009 | Purvis et al. |
| 7,576,756 | B1 | 8/2009 | Good et al. |
| 7,603,620 | B2 | 10/2009 | Erol et al. |
| 7,640,164 | B2 * | 12/2009 | Sasaki et al. ............. 704/272 |
| 2002/0055854 | A1 * | 5/2002 | Kurauchi et al. ............. 705/1 |
| 2002/0073119 | A1 | 6/2002 | Richard |
| 2002/0184111 | A1 | 12/2002 | Swanson |
| 2003/0014445 | A1 | 1/2003 | Formanek et al. |
| 2003/0182402 | A1 | 9/2003 | Goodman et al. |
| 2004/0019851 | A1 | 1/2004 | Purvis et al. |
| 2004/0025109 | A1 | 2/2004 | Harrington et al. |
| 2004/0070631 | A1 | 4/2004 | Brown et al. |
| 2004/0093565 | A1 | 5/2004 | Bernstein et al. |
| 2004/0120589 | A1 | 6/2004 | Lopresti et al. |
| 2004/0145593 | A1 | 7/2004 | Berkner et al. |
| 2004/0181747 | A1 | 9/2004 | Hull et al. |
| 2004/0201609 | A1 * | 10/2004 | Obrador ............. 345/723 |
| 2004/0230570 | A1 | 11/2004 | Hatta et al. |
| 2005/0028074 | A1 | 2/2005 | Harrington et al. |
| 2005/0068581 | A1 | 3/2005 | Hull et al. |
| 2005/0071763 | A1 | 3/2005 | Hart et al. |
| 2005/0076290 | A1 | 4/2005 | Balinsky |
| 2005/0084136 | A1 * | 4/2005 | Xie et al. ............. 382/107 |
| 2005/0223326 | A1 | 10/2005 | Chang et al. |
| 2005/0229107 | A1 | 10/2005 | Hull et al. |
| 2005/0246375 | A1 | 11/2005 | Manders et al. |
| 2005/0289127 | A1 | 12/2005 | Giampaolo et al. |
| 2006/0022048 | A1 * | 2/2006 | Johnson ............. 235/462.1 |
| 2006/0136491 | A1 | 6/2006 | Berkner et al. |
| 2006/0136803 | A1 | 6/2006 | Erol et al. |
| 2006/0161562 | A1 | 7/2006 | McFarland et al. |
| 2007/0118399 | A1 * | 5/2007 | Avinash et al. ............. 705/2 |
| 2007/0198951 | A1 | 8/2007 | Frank |
| 2007/0201752 | A1 | 8/2007 | Gormish et al. |
| 2007/0208996 | A1 | 9/2007 | Berkner et al. |
| 2008/0005690 | A1 | 1/2008 | Van Vugt |
| 2008/0168154 | A1 | 7/2008 | Skyrm et al. |
| 2008/0235207 | A1 | 9/2008 | Berkner |
| 2008/0235276 | A1 | 9/2008 | Erol et al. |
| 2008/0235564 | A1 | 9/2008 | Erol et al. |
| 2008/0235585 | A1 | 9/2008 | Hart et al. |

FOREIGN PATENT DOCUMENTS

| | | |
|---|---|---|
| JP | 10-105694 | 4/1998 |
| JP | 10-116065 | 5/1998 |
| JP | 10-162003 | 6/1998 |
| JP | 2000-231475 | 8/2000 |
| JP | 2000-306103 | 11/2000 |
| JP | 2001-101164 | 4/2001 |
| JP | 2002-351861 | 12/2002 |

OTHER PUBLICATIONS

El-Kwae, E., et al, "A Robust Framework for Content-Based Retrieval by Spatial Similarity in Image Databases", Transactions on Information Systems (TOIS), vol. 17, Issue 2, Apr. 1999, pp. 174-198.*

R.L. Rivest, H.H. Cormen, C.E. Leiserson, "Introduction to Algorithms", MIT Pres, MC-Graw-Hill, Cambridge Massachusetts, 1997. 6 pages.

H. Lam et al., "Summary Thumbnails: Readable Overviews for Small Screen Web Browsers", CHI 2005, Apr. 2-7, 2005, XP002378456, 10 Pages, Portland, OR.

B. Erol et al., "Multimedia Thumbnails: A New Way to Browse Documents on Small Display Devices", Ricoh Technical Report No. 31, XP002438409, 6 Pages, Dec. 2005, http://www.ricoh.co.jp/about/business_overview/report/31/pdf/A3112.pdf>.

Search Report, European Patent Office, Application No. EP 07 25 0134, Jun. 21, 2007, 9 Pages.

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

Fukumoto, Fumiyo, et al, "An Automatic Extraction of Key Paragraphs Based on Context Dependency," Proceedings of Fifth Conference on Applied Natural Language Processing, 1997, pp. 291-298.

Aiello, Marco, et al, "Document Understanding for a Broad Class of Documents," vol. 5(1), International Journal on Document Analysis and Recognition (IJDAR) (2002) 5, pp. 1-16.

"About Netpbm," home page for Netpbm downloaded on Jan. 29, 2010, http://netpbm.sourceforge.net/, pp. 1-5.

"Optimization Technology Center of Northwestern University and Argonne National Laboratory," http://www.optimization.eecs.northwestern.edu/, 1 page, downloaded Jan. 29, 2010.

Meller, Russell D., et al., "The Facility Layout Problem: Recent and Emerging Trends and Perspectives," Journal of Manufacturing Systems, vol. 15/No. 5 1996, pp. 351-366.

Gould, Nicholas I.M., et al., "A Quadratic Programming Bibliography," http://www.optimization-online.org/DB_FILE/2001/02/285.pdf, 139 pages.

Anjos, Miguel F., et al., "A New Mathematical Programming Framework for Facility Layout Design," University of Waterloo Technical Report UW-W&CE#2002-4, www.optimization online.org./DB_HTML/2002/454.html, 18 pages.

Maderlechner, et al., "Information Extraction from Document Images using Attention Based Layout Segmentation," Proceedings of DLIA, 1999, pp. 216-219.

Wang, et al., "MobiPicture—Browsing Pictures on Mobile Devices," 2003 Multimedia Conference, Proceedings of the 11th ACM International Conference on Multimedia, ACM MM'03, ACM 1-58113-722-2/03/0011, Berkeley, California, Nov. 2-8, 2003, 5 pages.

Fan, et al. "Visual Attention Based Image Browsing on Mobile Devices," International Conference on Multimedia and Exp., vol. 1, Baltimore, MD., IEEE, 0/7803-7965-9/03 Jul. 2003, pp. 53-56.

"Human Resources Toolbox, Human Resources Toolbox, Building an Inclusive Development Community: Gender Appropriate Technical Assistance to InterAction Member Agencies on Inclusion of People with Disabilities," Mobility International USA, 2002 Mobility International USA, http://www.miusa.org/idd/keyresources/hrtoolbox/humanresourcestlbx/?searchterm=Human Resources Toolbox, downloaded Feb. 3, 2010, 1 page.

Roth, et al., "Auditory Browser for Blind and Visually Impaired Users," CHI'99, Pittsburgh, Pennsylvania, May 15-20, 1999, ACM ISBN 1-58113-158-5, pp. 218-219.

Erol, Berna, et al., An Optimization Framework for Multimedia Thumbnails for Given Time, Display, and Application Constraints, Aug. 2005, 1-17 pages.

Dahl, Joachin and Vandenbeube, Lieven, "CVXOPT: A Python Package for Convex Optimization," http://abel.ee.ucla.edu/cvxopt/ downloaded Feb. 5, 2010, 2 pages.

Grant, Michael, et al., "CVX, Matlab Software for Disciplined Convex Programming," http://www.stanford.edu/~boyd/cvx/, downloaded Feb. 5, 2010, 2 pages.

Haralick, Robert M., "Document Image Understanding: Geometric and Logical Layout," IEEE Computer Vision and Pattern Recognition 1994 (CVPR94), 1063-6919/94, pp. 385-390.

Hsu, H.T., "An Algorithm for Finding a Minimal Equivalent Graph of a Digraph," Journal of the ACM (JACM), V. 22 No. 1, Jan. 1975, pp. 11-16.

Nagy, Georgy, et. al., "Hierarchical Representation of Optically Scanned Documents," Proc. Seventh Int'l Conf. Pattern Recognition, Montreal, 1984 pp. 347-349.

Dengel, A., "Anastasil: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.

Duda, et al., "Pattern Classification, " Second Edition, Chapter 1—Introduction, Copyright© 2001 by John Wiley & Sons, Inc., New York, ISBN0-471-05669-3 (alk. paper), 22 pages.

Gao, et al., "An Adaptive Algorithm for Text Detection from Natural Scenes," Proceedings of the 2001 IEEE Computer Society Conferences on Computer Vision and Pattern Recognition, Kauai, HI, USA, Dec. 8-14, 6 pages.

Polyak, et al., "Mathematical Programming: Nonlinear Rescaling and Proximal-like Methods in Convex Optimization," vol. 76, 1997, pp. 265-284.

Baldick, et al., "Efficient Optimization by Modifying the Objective Function: Applications to Timing-Driven VLSI Layout," IEEE Transactions on Circuits and Systems, vol. 48, No. 8, Aug. 2001, pp. 947-956.

Kandemir, et al. "A Linear Algebra Framework for Automatic Determination of Optimal Data Layouts," IEEE Transactions on Parallel and Distributed System, vol. 10, No. 2, Feb. 1999, pp. 115-135.

Lin, Xiaofan, "Active Document Layout Synthesis," IEEE Proceedings of the Eight International Conference on Document Analysis and Recognition, Aug. 29, 2005-Sep. 1, 2005, XP010878059, Seoul, Korea, pp. 86-90.

Boyd, Stephen, et al. "Review of Convex Optimization," Internet Article, http://www.cambridge.org/us/catalogue/catalogue.asp?isbn=0521833787, Cambridge University Press, XP-002531694, Apr. 8, 2004, pp. 1-2.

European Patent Office Search Report for European Patent Application EP 07 25 0928, Jul. 8, 2009, 7 pages.

Fukuhara, R., "International Standard for Motion Pictures in addition to Still Pictures: Summary and Application of JPEG2000/Motion-JPEG2000 Second Part", Interface, Dec. 1, 2002, 13 pages, vol. 28-12, CQ Publishing Company, *no translation provided*, 17 pages.

Japanese Office Action for Japanese Patent Application No. 2004-018221, dated Jun. 9, 2009, 6 pages.

Harrington, Steven J., et al., "Aesthetic Measures for Automated Document Layout," Proceedings of Document Engineering '04, Milwaukee, Wisconsin, ACM 1-58113-938-01/04/0010, Oct. 28-30, 2004, 3 pages.

Opera Software, "Opera's Small-Screen Rendering™," http://web.archive.org/web/20040207115650/http://www.opera.com/products/smartphone/smallscreen/ downloaded Feb. 25, 2010, pp. 1-4.

"AT&T Natural Voices" website, http://web.archive.org/web/20060318161559/http://www.nextup.com/attnv.html, downloaded Feb. 25, 2010, pp. 1-3.

European Patent Office Search Report for European Patent Application EP 08 152 937.2-1527, Jun. 8, 2009, 4 pages.

European Patent Office Search Report for European Patent Application EP 08 152 937.2-1527, Jul. 9, 2008, 7 pages.

Erol, B., et al., "Multimedia Thumbnails for Documents," Proceedings of the MM'06, XP-002486044, [Online] URL: http://www.stanford.edu/{sidj/papers/mmthumbs_acm.pdf>, ACM 1-59593-447-2/06/0010, Santa Barbara, California, Oct. 23-27, 2006, pp. 231-240.

Berkner, Kathrin, et al., "SmartNails - Display and Image Dependent Thumbnails," Proceedings of SPIE-IS&T Electronic Imaging, SPIE vol. 5296© 2004, SPIE and IS&T-0277-786X/04, Downloaded form SPIE Digital Library on Jan. 29, 2010 to 151.207.244.4, pp. 54-65.

European Patent Office Search Report for European Patent Application EP 08153000.8-1527, Oct. 7, 2008, 7 pages.

World Wide Web Consortium, Document Object Model Level 1 Specification, ISBN-10; 1583482547, Iuniverse Inc, 2000.

Erol, B., et al., "Computing a Multimedia Representation for Documents Given Time and Display Constraints," Proceedings of ICME 2006, Toronto, Canada, 2006, pp. 2133-2136.

Erol, B., et al., "Prescient Paper: Multimedia Document Creation with Document Image Matching," IEEE Proceedings of the 17th International Conference on Pattern Recognition, 2004, ICPR 2004, vol. 2, Downloaded on May 6, 2010, pp. 675-678.

Marshall, C.C, et al., "Reading-in-the-Small: A Study of Reading on Small Form Factor Devices," Proceedings of the JCDL 2002, Jul. 13-17, 2002, Portland, Oregon, ACM 1-58113-513-0/02/0007, pp. 56-64.

Breuel, T., et al., "Paper to PDA," Proceedings of the 16th International Conference on Pattern Recognition, vol. 1, Publication Date: 2002, pp. 476-479.

Chen, F., et al., "Extraction of Indicative Summary Sentences from Imaged Documents," Proceedings of the Fourth International Conference on Document Analysis and Recognition, 1997, vol. 1, Publication Date: Aug 18-20, 1997, pp. 227-232.

Alam, H., et al., "Web Page Summarization for Handheld Devices: A Natural Language Approach," Proceedings of the 7th International Conference on Document Analysis and Recognition, 2003, pp. 1153-1157.

Eglin, V., et al., "Document Page Similarity Based on Layout Visual Saliency: Application to Query by Example and Document Classification," Proceedings of the 7th International Conference on Document Analysis and Recognition, 2003, Publication Date: Aug. 3-6, 2003, pp. 1208-1212.

Xie, Xing, et al., "Learning User Interest for Image Browsing on Small-Form-Factor Devices," Proceedings of ACM Conference Human Factors in Computing Systems, 2005, pp. 671-680.

Neelamani, Ramesh, et al., "Adaptive Representation of JPEG 2000 Images Using Header-Based Processing," Proceedings of IEEE International Conference on Image Processing 2002, pp. 381-384.

Xie, Xing, et al., "Browsing Large Pictures Under Limited Display Sizes," IEEE Transactions on Multimedia, vol. 8 Issue: 4, Digital Object Identifier: 10.1109/TMM.2006.876294, Date: Aug. 2006, pp. 707-715.

Liu, F, et al., "Automating Pan and Scan," Proceedings of International Conference of ACM Multimedia, Oct. 23-278, 2006,Santa Barbara, CA, ACM 1-59593-447-2/06/0010, 10 pages.

Woodruff, Allison, et al., "Using Thumbnails to Search the Web," Proceedings from SIGCHI 200, Mar. 31-Apr. 4, 2001, Seattle, WA, ACM 1-58113-327-8/01/0003, pp. 198-205.

Secker, A., et al., "Highly Scalable Video Compression with Scalable Motion Coding," IEEE Transactions on Image Processing, vol. 13, Issue 8, Date: Aug. 2004, Digital Object Identifier: 10.1109/TIP.2004.826089, pp. 1029-1041.

"ISO/IEC JTC 1/SC 29/WG 1 N1646R, (ITU-T SG8) Coding of Still Pictures, JBIG (Joint Bi-Level Image Experts Group)," JPEG—(Joint Photographic Experts Group), Mar. 16, 2000, Title: JPEG 2000 Part I Final Committee Draft Version 1.0, Source: ISO/IEC JTC1/SC29 WG1, JPEG 2000, Editor Martin Boliek, Co-Editors: Charilaos Christopoulous, and Eric Majani, Project: 1.29.15444 (JPEG 2000), 204 pages.

"Information Technology—Coding of Audio-Visual Objects—Part 2: Visual," ITU-T International Standard ISO/IEC 14496-2 Second Edition, Dec. 1, 2001 (MPEG4-AVC), Reference No.: ISO/IEC 14496-2:2001(E), 536 pages.

Adobe, "PDF Access for Visually Impaired," http://web.archive.org/web/20040516080951/http://www.adobe.com/support/salesdocs/10446.htm, downloaded May 17, 2010, 2 pages.

"FestVOX," http://festvox.org/voicedemos.html, downloaded May 6, 2010, 1 page.

\* cited by examiner

METHODS FOR COMPUTING A NAVIGATION PATH

RELATED APPLICATIONS

This application is related to the co-pending application entitled "*Creating Visualizations of Documents*," filed on Dec. 20, 2004, U.S. patent application Ser. No. 11/018,231, assigned to the corporate assignee of the present invention.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

The present invention is related to processing and presenting documents; more particularly, the present invention is related to composing a document in such a way as to have audible and/or visual information in the document identified and have audible information synthesized to play when displaying a representation of a portion of the document.

BACKGROUND OF THE INVENTION

With the increased ubiquity of wireless networks, mobile work, and personal mobile devices, more people browse and view web pages, photos, and even documents using small displays and limited input peripherals. One current solution for web page viewing using small displays is to design simpler, low-graphic versions of web pages. Photo browsing problems are also partially solved by simply showing a low resolution version of photos and giving the user the ability to zoom in and scroll particular areas of each photo.

Browsing and viewing documents, on the other hand, is a much more challenging problem. Documents may be multi-page, have a much higher resolution than photos (requiring much more zooming and scrolling at the user's side in order to observe the content), and have highly distributed information (e.g., focus points on a photo may be only a few people's faces or an object in focus where a typical document may contain many focus points, such as title, authors, abstract, figures, references). The problem with viewing and browsing documents is partially solved for desktop and laptop displays by the use of document viewers and browsers, such as Adobe Acrobat (www.adobe.com) and Microsoft Word (www.microsoft.com). These allow zooming in a document, switching between document pages, and scrolling thumbnail overviews. Such highly interactive processes can be acceptable for desktop applications, but considering that mobile devices (e.g., phones and PDAs) have limited input peripherals, with limited input and smaller displays, a better solution for document browsing and viewing is needed for document browsing on these devices.

Ricoh Innovations of Menlo Park, Calif. developed a technology referred to herein as SmartNail Technology. SmartNail Technology creates an alternative image representation adapted to given display size constraints. SmartNail processing may include three steps: (1) an image analysis step to locate image segments and attach a resolution and importance attribute to them, (2) a layout determination step to select visual content in the output thumbnail, and (3) a composition step to create the final SmartNail image via cropping, scaling, and pasting of selected image segments. The input, as well as the output of SmartNail processing, is a still image. All information processed during the three steps results in static visual information. For more information, see U.S. patent application Ser. No. 10/354,811, entitled "Reformatting Documents Using Document Analysis Information," filed Jan. 29, 2003, published Jul. 29, 2004 (Publication No. US 2004/0146199 A1) and U.S. patent application Ser. No. 10/435,300, entitled "Resolution Sensitive Layout of Document Regions," filed May 9, 2003, published Jul. 29, 2004 (Publication No. US 2004/0145593 A1).

Web page summarization, in general, is well-known in the prior art to provide a summary of a webpage. However, the techniques to perform web page summarization are heavily focused on text and usually does not introduce new channels (e.g., audio) that are not used in the original web page. Exceptions include where audio is used in browsing for blind people as is described below and in U.S. Pat. No. 6,249,808.

Maderlechner et al. discloses first surveying users for important document features, such as white space, letter height, etc and then developing an attention based document model where they automatically segment high attention regions of documents. They then highlight these regions (e.g., making these regions print darker and the other regions more transparent) to help the user browse documents more effectively. For more information, see Maderlechner et al., "Information Extraction from Document Images using Attention Based Layout Segmentation," Proceedings of DLIA, pp. 216-219, 1999.

At least one technique in the prior art is for non-interactive picture browsing on mobile devices. This technique finds salient, face and text regions on a picture automatically and then uses zoom and pan motions on this picture to automatically provide close ups to the viewer. The method focuses on representing images such as photos, not document images. Thus, the method is image-based only, and does not involve an audio channel for thumbnails. Also there are no time attributes associated with each visual segment as we have here. For more information, see Wang et al., "MobiPicture—Browsing Pictures on Mobile Devices," ACM MM'03, Berkeley, November 2003 and Fan et al., "Visual Attention Based Image Browsing on Mobile Devices," International Conference on Multimedia and Exp, vol. 1, pp. 53-56, Baltimore, Md., July 2003.

Conversion of documents to audio in the prior art mostly focuses on aiding visually impaired people. For example, Adobe provides a plug-in to Acrobat reader that synthesizes PDF documents to speech. For more information, see Adobe, PDF access for visually impaired, http://www.adobe.com/support/salesdocs/10446.htm. Guidelines are available on how to create an audiocassette from a document for blind or visually impaired people. As a general rule, information that is included in tables or picture captions is included in the audio cassette. Graphics in general should be omitted. For more information, see "Human Resources Toolbox," Mobility International USA, 2002, www.miusa.org/publications/Hrtoolboxintro.htm. Some work has been done on developing a browser for blind and visually impaired users. One technique maps a graphical HTML document into a 3D virtual sound space environment, where non-speech auditory cures differentiate HTML documents. For more information, see Roth et al., "Auditory browser for blind and visually impaired users." CHI'99, Pittsburgh, Pa., May 1999. In all the applications for blind or visually impaired users, the goal appears to be transforming as much information as possible into the audio channel without having necessarily constraints on the channel and giving up on the visually channel completely.

Other prior art techniques for use in conversion of messages includes U.S. Pat. No. 6,249,808, entitled "Wireless Delivery of Message Using Combination of Text and Voice," issued Jun. 19, 2001. As described therein, in order for a user to receive a voicemail on a handheld device, a voicemail message is converted into a formatted audio voicemail message and formatted text message. The portion of the message that is converted to text fills the available screen on the handheld device, while the remainder of the message is set as audio.

SUMMARY OF THE INVENTION

A method, apparatus and article of manufacture for creating visualizations of documents are described. In one embodiment, the method comprises receiving audible, visual, and audiovisual document elements, computing time attributes associated with the audible, visual, and audiovisual document elements based on display and application constraints, computing information content attributes associated with the audible, visual, and audiovisual document elements based on display constraints, selecting a set of one or more of the audible, visual and audiovisual document elements for inclusion into a multimedia representation based on the time and information content attributes, and composing the multimedia representation using the set of one or more of the audible, visual and audiovisual document elements.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
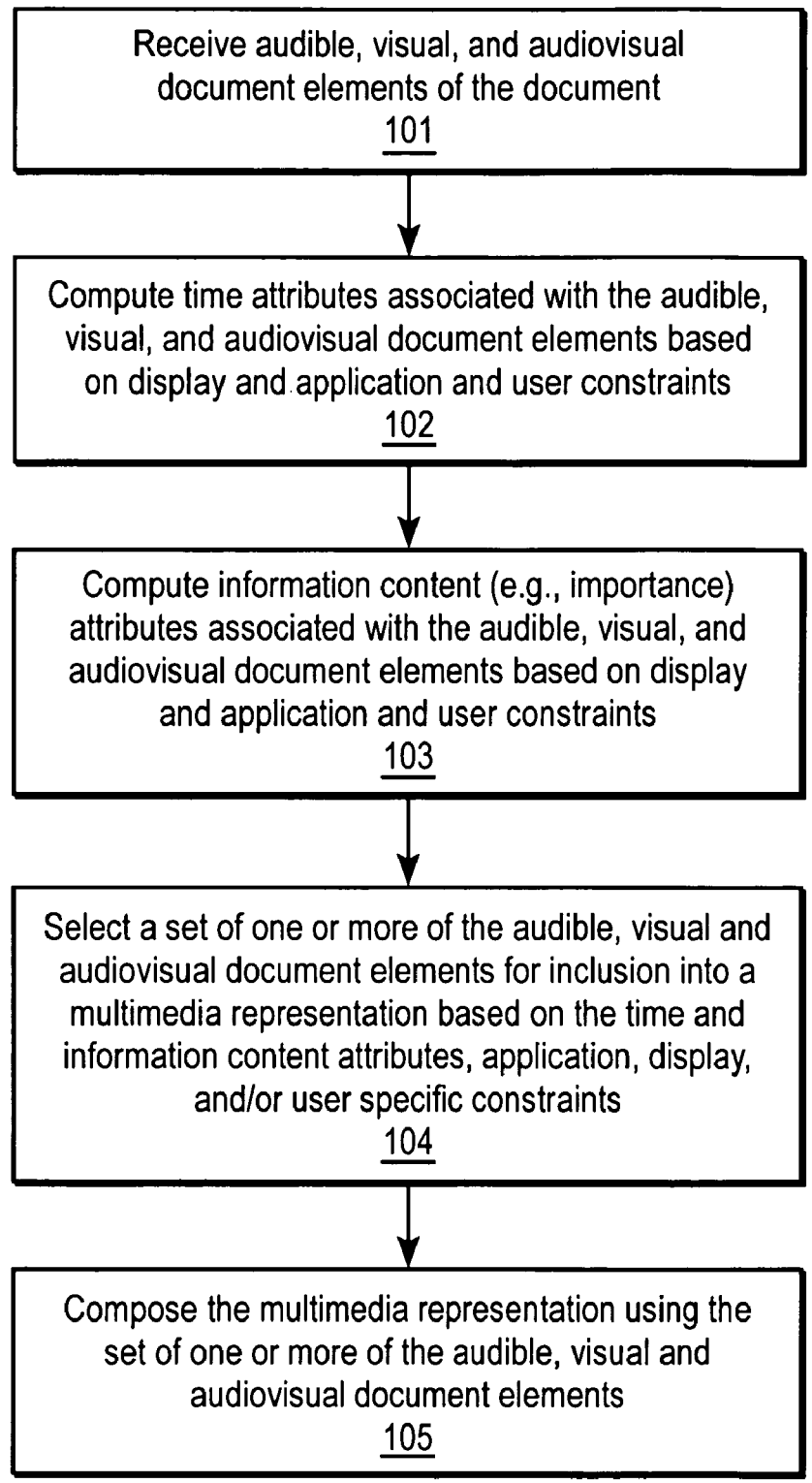
FIG. 1 is a flow diagram of one embodiment of a process for creating a multimedia representation of a document.

A method and apparatus for generating multimedia overviews of documents, referred to herein as Multimedia Thumbnails (MMNails), are described. The techniques represent multi-page documents on devices with small displays via utilizing both audio and visual channels and spatial and temporal dimensions. It can be considered an automated guided tour through the document.

In one embodiment, MMNails contain the most important visual and audible (e.g., keywords) elements of a document and present these elements in both the spatial domain and the time dimension. A MMNail may result from analyzing, selecting and synthesizing information considering constraints given by the output device (e.g., size of display, limited image rendering capability) or constraints on an application (e.g., limited time span for playing audio).

In one embodiment, the multimedia overview generation process includes extracting multimedia information from still image documents (visual, audible, and audiovisual), assigning of information values and time attributes to visual and audible and audiovisual information segments, and optimizing multimedia information for visual and audio channels given device and application constraints. Thus, MMNails can, but not necessarily have to, use both channels. Depending on the device or user preference, one of the two channels may be preferred over the other. As a result, MMNails utilize both the visual and audio channel of the device to present an overview of the document in a limited display and in a limited time-frame, and reduce, and potentially minimize the interaction required by the user.

One aspect of MMNails is the selection of document elements to be included in the final representation, given time and display constraints. In one embodiment, the time and information/relevance attributes for each of the document elements is first computed and then an optimizer is employed to select the best elements to be included in the MMNails. An optimization framework measures new computation measures for time attributes of visual and audiovisual document elements. In one embodiment, an optimization scheme, which is a modified version of a Knapsack algorithm, is used with these measures.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A selection scheme is set forth below that takes visual, audible, and audiovisual elements of a document and based on the time and information content (e.g., importance) attributes, and time, display, and application constraints, selects a combination and navigation path of the document elements. In so doing, a multimedia representation of the document may be created.

FIG. 1 is a flow diagram of one embodiment of a process for creating a multimedia representation of a document. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic receiving audible, visual, and audiovisual document elements of the document (processing block 101). A discussion of how the audible, visual and audiovisual document elements are obtained is given below.

With the audible, visual, and audiovisual document elements, processing logic computes time attributes associated with the audible, visual, and audiovisual document elements based on display and at least one of application and user specific constraints (processing block 102). In one embodiment, the display constraint is display size of a device for which the multimedia presentation is being generated.

Processing logic also computes information content (e.g., importance) attributes associated with the audible, visual, and audiovisual document elements based on display and at least one of application and user specific constraints (processing block 103).

After computing time and information content attributes, processing logic selects a set of one or more of the audible, visual and audiovisual document elements for inclusion into a multimedia representation based on the time and information content attributes as well as display constraints and at least one of application and user constraints (processing block 104). In one embodiment, processing logic selects either a combination of the visual and audiovisual information in a first stage and the audible information in a second stage selects a combination of audible and audiovisual information in the first stage and the visual information in the second stage. In either case, processing logic selects a first set of document elements to maximize information contained in that in the first stage subject to a given time constraint, and selects a second set of document elements to maximize information contained in the second set in the second stage subject to an amount of time remaining in duration of the multimedia representation after maximizing the selected document elements. In one embodiment, the selection is based on an input that is based on one or more of an application and/or user constraints. In one embodiment, the selection of which stage is first and which stage is second is based on an input from one or more of an application and/or user constraints. In one embodiment, the maximization of selected document elements is subject to a page thumbnail constraint.

After the audible, visual and audiovisual document elements have been selected, processing logic composes the multimedia representation using the set of one or more of the audible, visual and audiovisual document elements (processing block 105). In one embodiment, processing logic composes the multimedia representation by outputting a navigation path by which the set of one or more of the audible, visual and audiovisual document elements are processed when creating the multimedia representation. A navigation path defines how audible, visual, and audiovisual elements are presented to the user in a time dimension in a limited display area. It also defines the transitions between such elements. A navigation path may include ordering of elements with respect to start time, locations and dimensions of document elements, the duration of focus of an element, the transition type between document elements (e.g., pan, zoom, fade-in), and the duration of transitions, etc. This may include reordering the set of the audible, visual and audiovisual document elements in reading order.

Obtaining Audible, Visual and Audiovisual Document Elements

In one embodiment, the audible, visual and audiovisual document elements are created or obtained using an analyzer (not shown). The analyzer receives a document and may receive metadata. The metadata may include author information and creation data, text (e.g., in a pdf file format where the text may be metadata and is overlayed with the document image), an audio or video stream, URLs, publication name, date, place, access information, encryption information, image and scan resolution, MPEG-7 descriptors etc. In response to these inputs, the analyzer performs pre-processing on these inputs and generates outputs information indicative of one or more visual focus points in the document, information indicative of audible information in the document, and information indicative of audiovisual information in the document. If information extracted from a document element is indicative of visual and audible information, this element is a candidate for an audiovisual element. An application or user may determine the final selection of audiovisual element out of the set of candidates. Audible and visual information in the audiovisual element may be synchronized (or not). For example, an application may require figures in a document and their captions to be synchronized. The audible information may be information that is important in the document and/or the metadata.

In one embodiment, the analyzer comprises a document pre-processing unit, a metadata pre-processing unit, a visual focus points identifier, important audible document information identifier and an audiovisual information identifier. In one embodiment, the document pre-processing unit performs one or more of optical character recognition (OCR), layout analysis and extraction, JPEG 2000 compression and header extraction, document flow analysis, font extraction, face detection and recognition, graphics extraction, and music notes recognition, which is performed depending on the application. In one embodiment, the document pre-processing unit includes Expervision OCR software (www.expervision.com) to perform layout analysis on characters and generates bounding boxes and associated attributes, such as font size and type. In another embodiment, bounding boxes of text zones and associated attributes are generated using ScanSoft software (www.nuance.com). In another embodiment, a semantic analysis of the text zone is performed in the manner described in Aiello M., Monz, C., Todoran, L., Worring, M., "Document Understanding for a Broad Class of Documents," International Journal on Document Analysis and Recognition (IJDAR), vol. 5(1), pp. 1-16, 2002, to determine semantic attributes such as, for example, title, heading, footer, and figure caption.

The metadata pre-processing unit may perform parsing and content gathering. For example, in one embodiment, the metadata preprocessing unit, given an author's name as metadata, extracts the author's picture from the world wide web (WWW) (which can be included in the MMNail later). In one embodiment, the metadata pre-processing unit performs XML parsing.

After pre-processing, the visual focus points identifier determines and extracts visual focus segments, while the important audible document information identifier determines and extracts important audible data and the audiovisual information identifier determines and extracts important audiovisual data.

In one embodiment, the visual focus points identifier identifies visual focus points based on OCR and layout analysis results from pre-processing unit and/or a XML parsing results from pre-processing unit.

In one embodiment, the visual focus points (VTP) identifier performs analysis techniques set forth in U.S. patent application Ser. No. 10/435,300, entitled "Resolution Sensitive Layout of Document Regions," filed May 9, 2003, published Jul. 29, 2004 (Publication No. US 2004/0145593 A1) to identify text zones and attributes (e.g., importance and resolution attributes) associated therewith. Text zones may include a title and captions, which are interpreted as segments. In one embodiment, the visual focus points identifier determines the title and figures as well. In one embodiment, figures are segmented.

In one embodiment, the audible document information (ADI) identifier identifies audible information in response to OCR and layout analysis results from the pre-processing unit and/or XML parsing results from the pre-processing unit.

Examples of visual focus segments include figures, titles, text in large fonts, pictures with people in them, etc. Note that these visual focus points may be application dependent. Also, attributes such as resolution and saliency attributes are associated with this data. The resolution may be specified as metadata. In one embodiment, these visual focus segments are determined in the same fashion as specified in U.S. patent application Ser. No. 10/435,300, entitled "Resolution Sensitive Layout of Document Regions," filed May 9, 2003, published Jul. 29, 2004 (Publication No. US 2004/0145593 A1). In another embodiment, the visual focus segments are determined in the same manner as described in Le Meur, O., Le Callet, P., Barba, D., Thoreau, D., "Performance assessment of a visual attention system entirely based on a human vision modeling," Proceedings of ICIP 2004, Singapore, pp. 2327-2330, 2004. Saliency may depend on the type of visual segment (e.g., text with large fonts may be more important than text with small fonts, or vice versa depending on the application). The importance of these segments may be empirically determined for each application prior to MMNail generation. For example, an empirical study may find that the faces in figures and small text are the most important visual points in an application where the user assess the scan quality of a document. The salient points can also be found by using one of the document and image analysis techniques in the prior art.

Examples of audible information include titles, figure captions, keywords, and parsed meta data. Attributes, e.g., information content, relevance (saliency) and time attributes (duration after synthesizing to speech) are also attached to the audible information. Information content of audible segments may depend on its type. For example, an empirical study may show that the document title and figure captions are the most important audible information in a document for a "document summary application".

Some attributes of VFPs and ADIs can be assigned using cross analysis. For example, the time attribute of a figure (VFP) can be assigned to be the same as the time attribute of the figure caption (ADI).

In one embodiment, the audible document information identifier performs Term Frequency-Inverse Document Frequency (TFIDF) analysis to automatically determine keywords based on frequency, such as described in Matsuo, Y., Ishizuka, M. "Keyword Extraction from a Single Document using Word Co-occurrence Statistical Information," International Journal on Artificial Intelligence Tools, vol. 13, no.1, pp. 157-169, 2004 or key paragraphs as in Fukumoto, F., Suzuki, Y., Fukumoto, J., "An Automatic Extraction of Key Paragraphs Based on Context Dependency," Proceedings of Fifth Conference on Applied Natural Language Processing, pp. 291-298, 1997. For each keyword, the audible document information identifier computes a time attribute as being the time it takes for a synthesizer to speak that keyword.

In a similar fashion, the audible document information identifier computes time attributes for selected text zones, such as, for example, title, headings, and figure captions. Each time attribute is correlated with its corresponding segment. For example, the figure caption time attribute is also correlated with the corresponding figure segment. In one embodiment, each audible information segment also carries an information content attribute that may reflect the visual importance (based on font size and position on a page) or reading order in case of text zone, the frequency of appearance in the case of keywords, or the visual importance attribute for figures and related figure captions. In one embodiment, the information content attribute is calculated in the same way as described in U.S. patent application Ser. No. 10/435,300, entitled "Resolution Sensitive Layout of Document Regions," filed May 9, 2003, published Jul. 29, 2004 (Publication No. US 2004/0145593 A1).

Audiodivisional document information (AVDI) is information extracted from audiovisual elements.

Thus, in one embodiment, using an electronic version of a document (not necessarily containing video or audio data) and its metadata, visual focus points (VFPs), important audible document information (ADIs), and audiovisual document information (AVDI) may be determined.

The visual focus segments, important audible information, and audiovisual information are given to the optimizer. Given the VFPs and the ADI, AVDI along with device and application constraints (e.g., display size, a time constraint), the optimizer selects the information to be included in the output representation (e.g., a multimedia thumbnail). In one embodiment, the selection is optimized to include the preferred visual and audible and audiovisual information in the output representation, where preferred information may include important information in the document, user preferred, important visual information (e.g., figures), important semantic information (e.g., title), key paragraphs (output of a semantic analysis), document context. Important information may include resolution sensitive areas of a document. The selection is based on computed time attributes and information content (e.g., importance) attributes.

Figure 2:
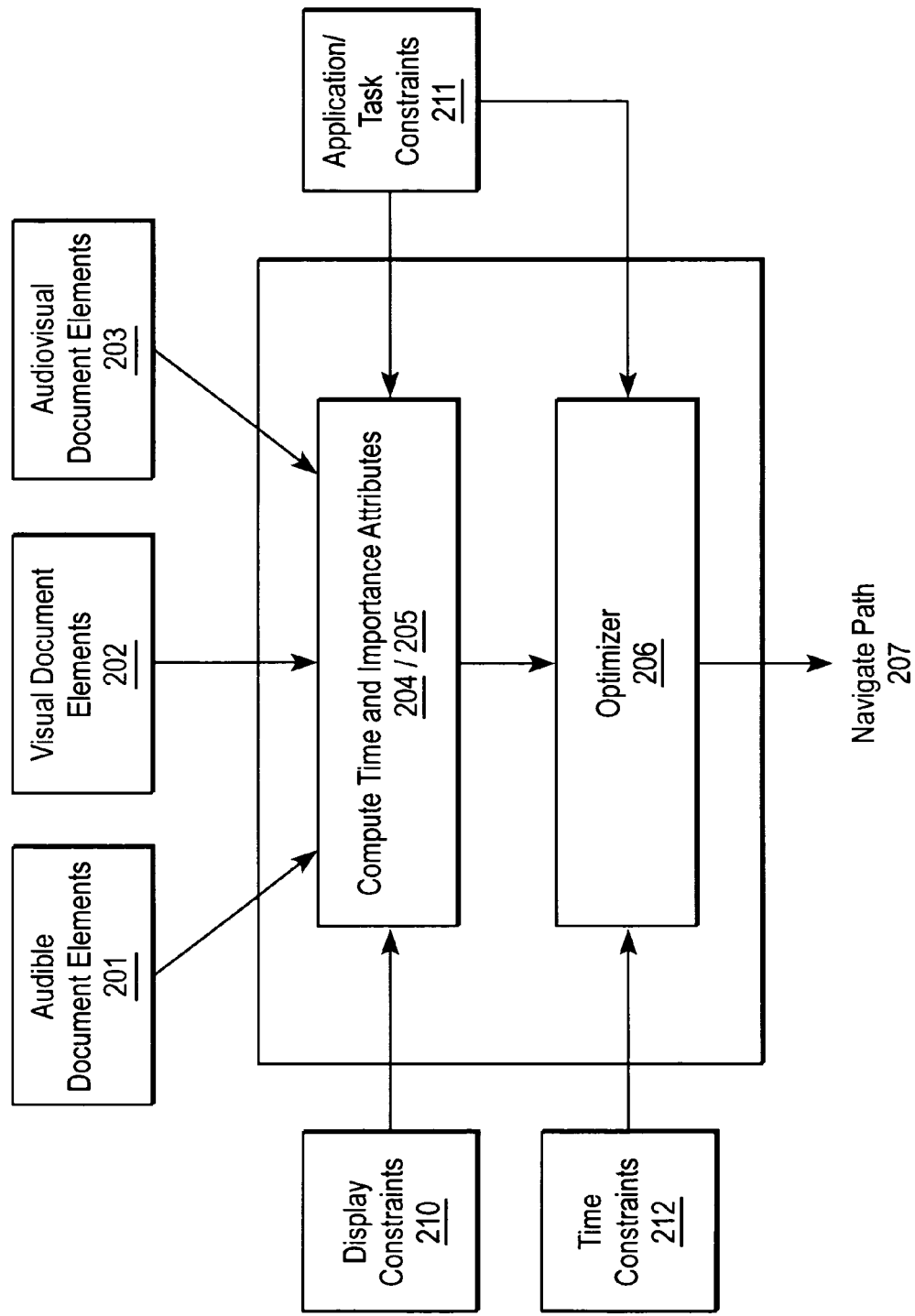
FIG. 2 is a flow diagram illustrating one embodiment of a process for processing the visual, audible and audiovisual information.

FIG. 2 is a flow diagram illustrating one embodiment of a process for processing the visual, audible and audiovisual information. The process is performed by processing logic that may comprise hardware (e.g., circuitry, dedicated logic, etc.), software (such as is run on a general purpose computer system or a dedicated machine), or a combination of both.

Referring to FIG. 2, the process begins by processing logic computes time attributes associated with audible document elements 201, visual document elements 202 and audiovisual document elements 203 using display constraints 210 and application/task and user-specific constraints 211 (processing block 204). Also, processing logic computes information content (e.g., importance) attributes associated with audible document elements 201, visual document elements 202 and audiovisual document elements 203 using display constraints 210 and application/task constraints 211 (processing block 206). Processing logic in optimizer 206 receives the computed time attributes, the computed information content attributes, and time constraints 212 and, in response thereto, generates navigation path 207.

After selection, the information is synthesized into visual data (for the visual channel, or representation), audio data (for the audio channel, or representation), and audiovisual data (for a combination of audio and visual channel, or representation) to create a multimedia thumbnail. Thus, a thumbnail, in this context, may refer to a representation in which material from the document is presented visually and audibly.

A number of these operations will be described in more detail below, including computing time attributes for a visual elements, computing time attributes for an audiovisual elements and two-stage optimization algorithm with page constraint.

Computation of Time Attributes

The optimization of the selection of document elements for the multimedia representation generally involve spatial constraints, such as optimizing layout and size for readability and reducing spacing. In such frameworks, some information content (semantic, visual) attributes are commonly associated with document elements. In the framework described herein, in one embodiment, both the spatial presentation and time presentation are optimized. To that end, "time attributes" are associated with document elements. In the following sections, the assignment of time attributes for audible, visual, and audiovisual document elements are explained in detail.

Computing Time Attributes for Audible Elements $t_{a,j}$

Audible elements of documents can be in various formats, such as text, waveform, and music notes. In one embodiment, the optimum time to playback a waveform or music notes are generally inherent in their representation (such as the timeline of the waveform etc), and can be automatically associated with these elements as their time attributes.

For an audible element that is in the text form, in one embodiment, time attribute is computed as follows:

$$t_{a,j} = SSC \times N \quad (Eq\ 1)$$

where N is number of characters in the text, and SSC (Speech Synthesis Constant) is the average time required to play back the synthesized audio per character. In one embodiment, SSC is computed as follows: (1) synthesize a text document with the known number of characters, K, (2) measure the total time it takes for the synthesized speech to be spoken out, T, and set SSC=T/K The SSC constant may change depending on the language choice, synthesizer that is used and the synthesizer options (female vs. male voice, accent type, talk speed, etc). In one embodiment, with an AT&T speech SDK (available at http://www.nextup.com/attnv.html) the SSC for female English language is computed to be equal to 75 ms.

Computing Time Attributes of Visual Elements $t_{v,j}$

Visual elements of a document can be grouped into two sets as "text" elements and "figure" elements, such as images, tables, graphs, etc.

In one embodiment, time attribute for a text visual element is determined to be the duration of the visual effects necessary to show the text segment to the user in a readable resolution.

Figure 3:
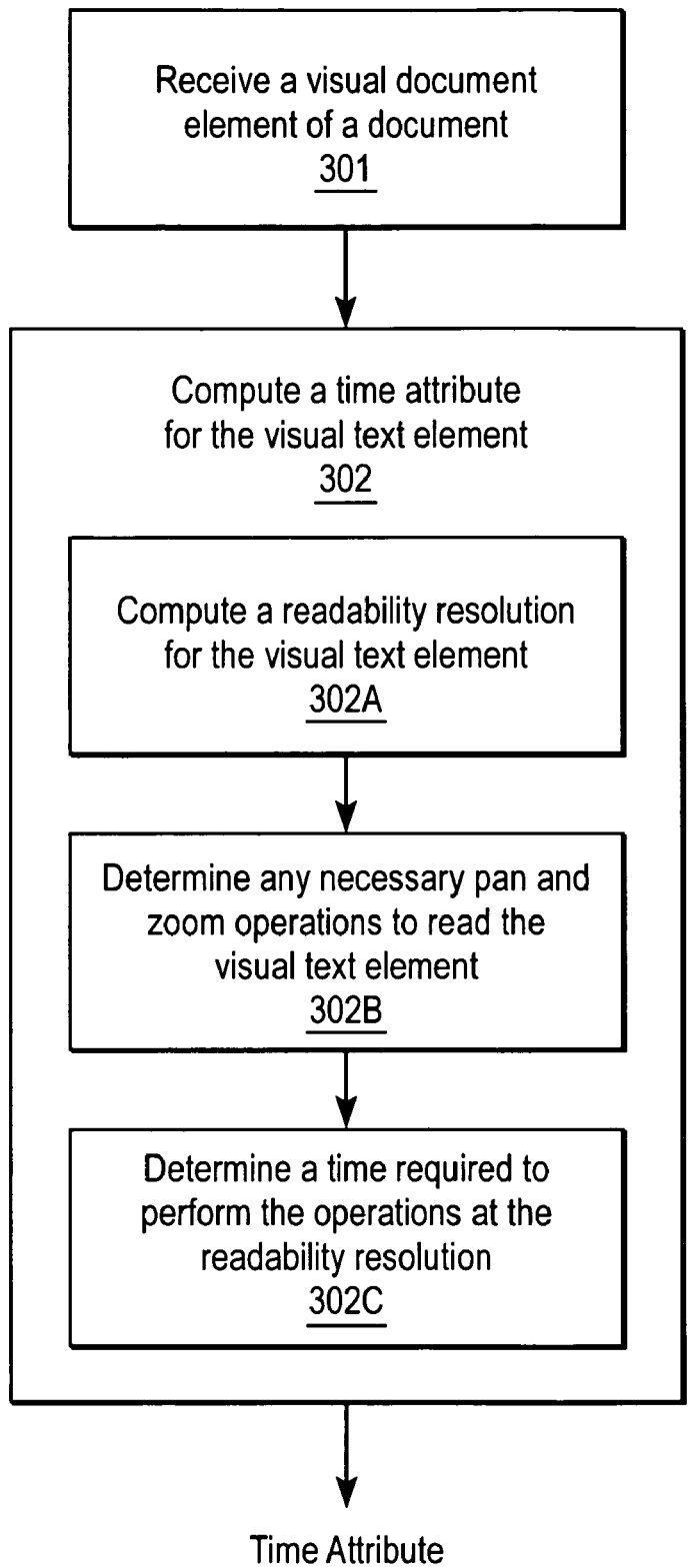
FIG. 3 is a flow diagram of one embodiment of a process for computing time attributes for visual text document elements of a document.

FIG. 3 is a flow diagram of one embodiment of a process for computing time attributes for visual text document elements of a document. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic receiving a visual text document element of a document (processing block 301). Using the visual text document element, processing logic computes a time attribute for the visual text element (processing block 302) by: computing a readability resolution for the visual text element (processing block 302A); determining any necessary pan and zoom operations to read the visual text element (processing block 302B); and determining a time required to perform the operations at the readability resolution (processing block 302C).

A general overview of one embodiment of the algorithm is given in FIG. 4 and an example of pseudo code is given below:

$w_d$: Display width (DC)
$h_d$: Display height (DC)
$w_p$: Page width (DI)
$h_p$: Page height (DI)
$w_{v,i}, h_{v,i}$: Original width and height of one text line (DEI)
N: Number of characters in the text (DEI)
MRH: Minimum readability height (=10 pixel) (DC)
ZOOMC:: Zoom to title constant (=0.5 sec) (AC)
PANC:: Pan pixel constant (=0.01 sec) (AC)

$t_{v,j} = 0, h_{v,i}' = h_{v,i}$ if $\left(\dfrac{w_d h_{v,i}}{w_p} \geq MRH\right)$ //first test if the text is visible in the thumbnail view.

If so, no need to zoom in
{
$t_{v,j}$ = SCC x N
}
else
{

$h_{v,i}' = \dfrac{w_d h_{v,i}}{w_{v,i}}$ //compute the new height, such that text width fills up the display width
if ($h_{v,i}'$ >= MRH) // test whether new height is big enough
    {
$t_{v,j}$ = ZOOMC + SCC × N           //Zoom to text and hold
    }
else
    {

$w_{v,i}' = \dfrac{w_{v,i} MRH}{h_{v,i}}$ //compute the new width diffw = $w_{v,i}'$ − $w_d$ //compute the remainder width that does not fit into display $initN = \dfrac{diffw}{w_{v,i}'} \times N$ $t_{v,j}$ = ZOOMC + SCC × N' + max(diffw × PANC, SCC × N")
N' ≤ N − initN, N" ≤ initN
    }
}
END The above code assumes that there is a single text line. This code can be adopted for multi-line situations by considering the height of all text lines, $ht_{v,i}$. Note also in the code above that DC=display constraint, DI=a document information, DEI=document element information, and AC=application constraint.

Figure 4:
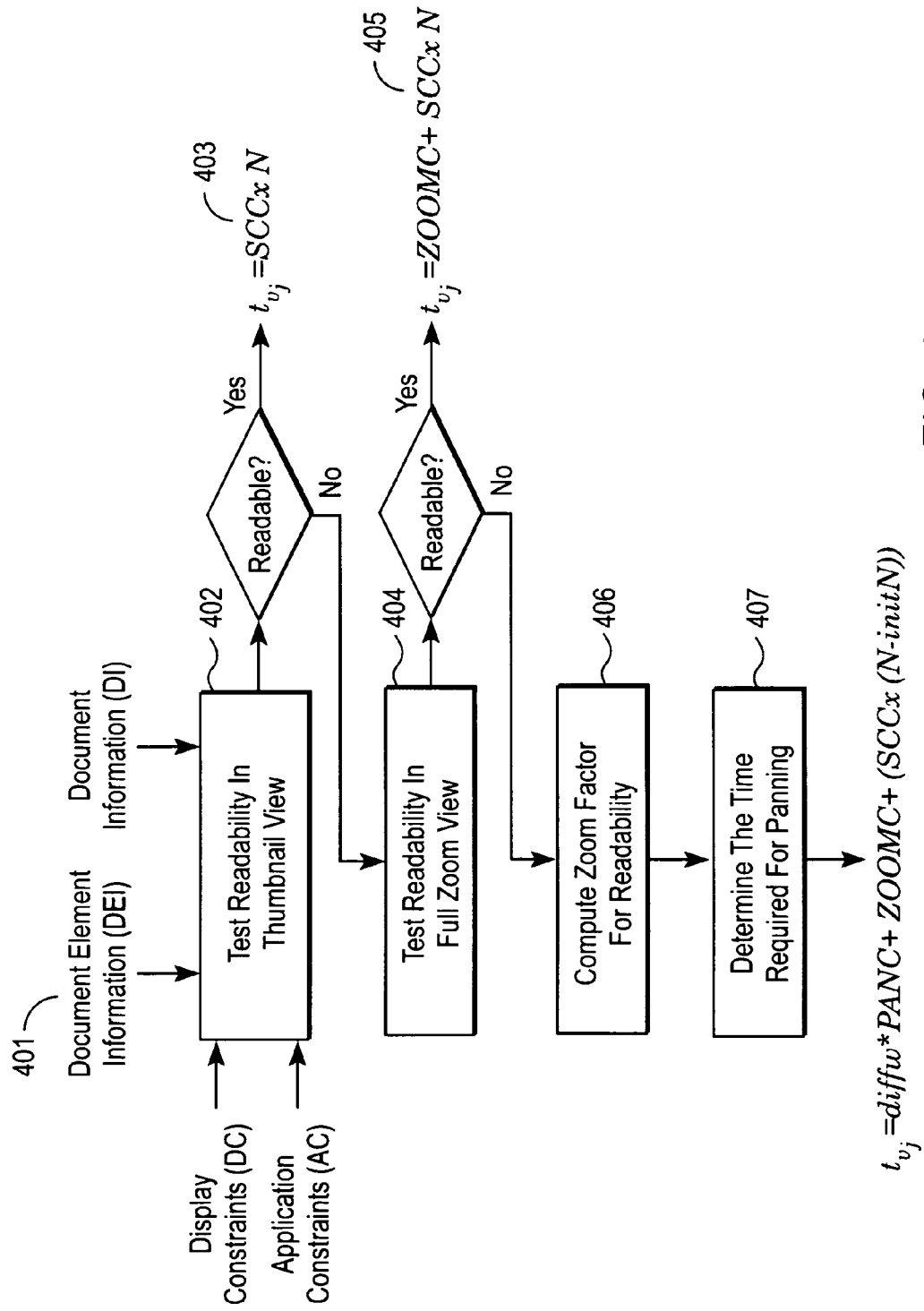
FIG. 4 is a flow diagram of another embodiment of a process for computing time attributes for visual text document elements of a document.

FIG. 4 is a flow diagram of another embodiment of a process for computing time attributes for visual text document elements of a document. The process is performed by processing logic that may comprise hardware (e.g., circuitry, dedicated logic, etc.), software (such as is run on a general purpose computer system or a dedicated machine), or a combination of both.

Referring to FIG. 4, the process begins by processing logic receiving a visual text document element of a document (processing block 401). Processing logic determines whether the visual text document element is readable in a first view based on display and application constraints and document information (processing block 402).

In one embodiment, the first view comprises a thumbnail view. In one embodiment, the display constraints comprise display width and display height and the document information is based on page width and page height. If it is, processing logic sets the time attribute equal to a product of a speech synthesis constant and a number of characters in the visual text element if the visual text element is determined to be readable (processing block 403).

If not readable in the first view, processing logic determines whether the visual text element is readable in a zoom view (processing block 404). If it is, processing logic sets the time attribute equal to a product of a speech synthesis constant and a number of characters in the visual text element plus a constant indicative of a time necessary to zoom to a title in the visual text element in the zoom view if readable in the zoom view (processing block 405).

If the visual text element is not readable in first or zoom views, processing logic computes a zoom factor indicative of an amount of zooming that is necessary for readability of text in the visual text element (processing block 406), determines a time required for panning, and sets setting the time attribute equal to a product of a pan pixel constant and a difference between the original text width and height of one line and the display width, plus a constant indicative of a time necessary to zoom to a title in the visual text element in the zoom view, plus a product of a speech synthesis constant and a result of subtracting a quotient of display height to a minimum readability height from the number of characters in the visual text element (processing block 407).

In another embodiment, processing logic zooms to the minimum readability height (MRH) and checks whether the width of the element fits into the width of the display. If it fits, then its accepted. If not, then panning is performed. The zoom constant need not be fixed. For example, the zoom constant may be calculated as $$ZOOMC = \dfrac{MRH}{h_{v,i}} \times (\text{a zoom speed factor}).$$

In yet another embodiment, in order to compute time attributes for a visual text element e, first the document image is downsampled to fit the display area. Then Z(e) is determined as the zoom factor that is necessary to bring the height of the smallest font in the text to the minimum readable height. Finally, the time attribute for a visual text element e is computed as follows:

$$t(e) = \begin{bmatrix} SCC\ n_e, & Z(e) = 1 \\ SCC \times n_e + Z_C, & Z(e) > 1 \end{bmatrix},$$

where $n_e$ is number of characters in e, $Z_c$ is zoom time (in our implementation this is fixed to be 1 second), and SSC (Speech Synthesis Constant) is the average time required to play back the synthesized audio character. Computation of t(e) remains the same even if a text element cannot be shown with one zoom operation and both zoom and pan operations are required. In such cases, the presentation time is utilized by first zooming into a portion of the text, for example the first m characters, and keeping the focus on the text for SCC×m seconds. Then the remainder of the time, i.e. SCC×($n_e$−m), is spent on the pan operation.

For figure elements, in one embodiment, the time attribute is computed based on the estimated time that is required for user to comprehend the document element. The comprehension time, CT, is based on the figure type and the entropy of the figure element $e_{v,i}$ as follows:

$$CT = FC(e_{v,i}) \times E(e_{v,i}),\qquad\text{(Eq. 2)}$$

where $FC(e_{v,i})$ is Figure Constant which is based on the figure type (image, table, graph, etc) and $E(e_{v,i})$ is the normalized entropy of the figure. In one embodiment, the normalization is performed as follows:

[entropy of figure]/[entropy of the entire page].

See U.S. patent application Ser. No. 10/354,811, entitled "Reformatting Documents Using Document Analysis Information," filed Jan. 29, 2003, published Jul. 29, 2004 (Publication No. US 2004/0146199 A1) and U.S. patent application Ser. No. 10/435,300, entitled "Resolution Sensitive Layout of Document Regions," filed May 9, 2003, published Jul. 29, 2004 (Publication No. US 2004/0145593 A1). The intuition of using the parameter $FC(e_{v,i})$ is that different types of figures take different amounts of time to comprehend. For example, images are generally easier to comprehend than graphs. Therefore, there are different constants for each of these different types of figures. For graphs and tables, the figure comprehension time may depend on the number of characters, words, and numbers contained in the visual element. CT also depends on the visual complexity of these document elements, which is based on its entropy.

Computing Time Attributes of Audiovisual Elements $e_{av,i}$

An audiovisual element is a document element that contains synchronized audio and visual components. An example is a figure with a caption, where the figure comprises the visual part and the synthesized speech of the figure caption is the audio part. In one embodiment, the time attributes for audio visual elements are different for audiovisual text elements and figure elements. These are discussed below.

Audiovisual elements of text type contain two components:

$V(e_{av,i})$: visual component of $e_{av,i}$ $A(e_{av,i})$: audio component of $e_{av,i}$, which is the synthesized text For audiovisual elements of text type, in one embodiment, the time attribute is computed as follows:

$$t_{av,i} = \max\{t_{V(e_{av,i})}, t_{A(e_{av,i})}\} \quad \text{(Eq 3)}$$

the variable $t_{V(e_{av,i})}$ is the time attribute of the visual part of element $e_{av,i}$. In one embodiment, this is computed using the code above. The variable $t_{A(e_{av,i})}$ is the time attribute of the audible part of element $e_{av,i}$. In one embodiment, this is computed using SCC as in Eq. 1 above.

Audiovisual elements of figure type contain two components:

$V(e_{av,i})$: visual component of $e_{av,i}$, which is figure, table, graph, etc.

$A(e_{av,i})$: audio component of $e_{av,i}$, which is figure caption, text in figure, etc.

However, most figure captions can be longer than people are willing to listen. There are several ways of shortening the captions. For example, if the caption consists of several sentences, only the first sentence can be synthesized. If the caption has many subsections such as (a) (b) etc, only the part until these subsections can be synthesized etc.

For audiovisual elements of figure type, in one embodiment, the time attribute is computed as follows:

$$t_{av,i} = \max\{CT(V(e_{av,i})), t_{A(e_{av,i})}\} \quad \text{(Eq 4)}$$

$CT(V(e_{av,i}))$ is figure comprehension time for the visual part of element $e_{av,i}$, as given in (Eq 2) above. The variable $t_{A(e_{av,i})}$ is the time attribute of the audible part of element $e_{av,i}$. In one embodiment, this is computed as given in Eq. 1 above.

Figure 5:
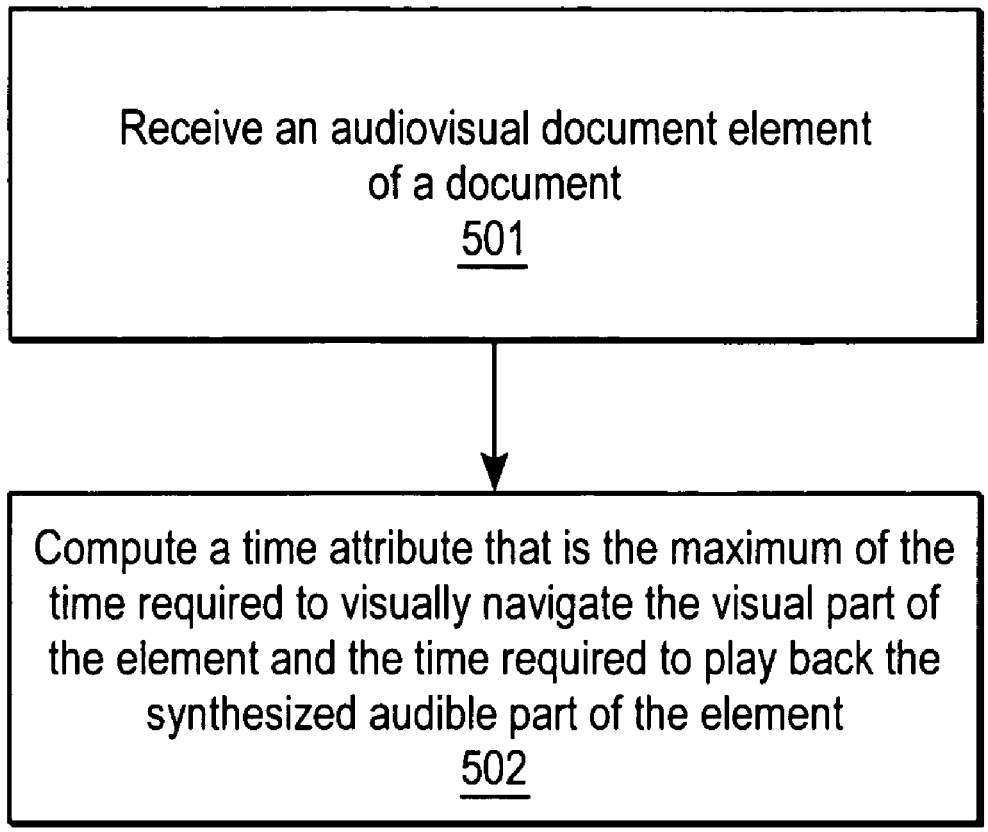
FIG. 5 is a flow diagram of one embodiment of a process for creating time attributes for audiovisual document elements of a document.

FIG. 5 is a flow diagram of one embodiment of a process for creating time attributes for audiovisual document elements of a document. The process is performed by processing logic that may comprise hardware (e.g., circuitry, dedicated logic, etc.), software (such as is run on a general purpose computer system or a dedicated machine), or a combination of both.

Referring to FIG. 5, the process begins by processing logic receiving an audiovisual document element of a document (processing block 501).

Next, processing logic computes a time attribute that is the maximum of the time required to visually navigate the visual part of the element and the time required to play back the synthesized part of the element (processing block 502).

In one embodiment, this is performed by processing logic determining whether the audiovisual document element is an audiovisual text element or an audiovisual figure element. If the audiovisual document element is an audiovisual text element, then processing logic computes a time attribute for the audiovisual element as a maximum of the time required to visually navigate a text portion of the audiovisual element and the time required to play back synthesized text associated with the audiovisual element. If the audiovisual document element is an audiovisual figure element, then processing logic computes the time attribute for the audiovisual element as a maximum of the time required to visually comprehend a figure portion of the audiovisual element and the time required to play back synthesized text associated with the audiovisual element.

Summary of Time Attributes

Table 1 below summarizes different document elements that can be included in Multimedia Thumbnails, their element type, and how time attributes are computed for each of the element type.

TABLE 1

| Elements | Element type | Time Attributes ($t_i$) |
|---|---|---|
| Title | AV | (Eq 3) |
| Sub Section N | AV | (Eq 3) |
| FIG. and FIG. caption N | AV | (Eq 4) |
| Abstract | V | (CODE 1 as shown above in paragraph 65) |
| References | V | (CODE 1) |
| FIG.-no caption* | V | (Eq 2) |
| Thumbnail of page N | V | TPC |
| Author names | V | (CODE 1) |
| Publication name | A | (Eq 1) |
| Publication date | A | (Eq 1) |
| Keyword | A | (Eq 1) |
| Page number | A | (Eq 1) |
| Number of pages | A | (Eq 1) |

*These FIGS. are the ones selected for combining with FIG. captions. FIGS. with no captions or very long captions are excluded from this group in the preprocessing.

In one embodiment, the thumbnail page constant (TPC) is equal to 1 second.

Information Content Attributes

With respect to document elements, information content, or importance, attributes are assigned to audio, visual, and audiovisual elements. The information content attributes are computed for different document elements.

Some document elements, such as title, for example, can be assigned fixed attributes, while others, such as, for example, figures, can be assigned content dependent importance attributes.

Information content attributes are either constant for an audio or visual element or computed from their content. Different sets of information content values may be made for different tasks, such as in the cases of document understanding and browsing tasks. These are considered as application constraints.

Examples of document elements and their types are given in Table 2 below.

TABLE 2

| Elements | Possible Element type | Preferred Element type |
|---|---|---|
| Title | V or AV | AV |
| Sub Section N | V or AV | AV |
| FIG. and FIG. caption N | AV | AV |
| Abstract | V or AV | V |
| References | V or AV | V |
| FIG.-no caption* | V | V |
| Thumbnail of page N | V | V |
| Author names | V or AV or A | V |
| Publication name | V or AV or A | A |
| Publication date | V or AV or A | A |
| Keyword | A | A |
| Page number | A or AV | A |
| Number of pages | A | A |

*These FIGS. are the ones selected for combining with FIG. captions. FIGS with no captions or very long captions are excluded from this group in the preprocessing.

In one embodiment, the choices of how to represent a document element are made based on user feedback. Some examples of reasoning for certain choices are given below:

In one embodiment, the choice between V and AV types is done based on approximately how long it would take to read-out the text. One assumption that may be used is that for short text, AV is better because audio channel can be in synchronization with user's reading speed. For long text, such as abstract, this probably would not be the case and the audio channel can be annoying instead of being useful.

For very short text, such as a publication name and date, an audio channel is chosen for communication.

Author names are selected to be visual elements since the synthesizer may make errors in the pronunciation of names.

Computing Information Attributes Based on Content

In one embodiment, information content attributes are computed as follows.

Thumbnail

Information content (e.g., importance) based on the page number (first page most important, then decrease it)

Information content (e.g., importance) based on the content (only text (very common, thus not much information content) versus text with figures and tables (more information in the thumbnail))

$v_{v,i} = \min\{1, 1/\text{pagenum} + PC\}$

PC: Page complexity Normalize PC to [0 0.5] range.

pagenum: page number $$PC = \alpha f(\text{title}) + \beta f(\text{sub section}) + \frac{\sum_n a_n w_{e_{v,n}} h_{e_{v,n}}}{w_p h_p} \begin{Bmatrix} a_n = 1 & \text{page}(e_{v,n}) = \text{pagenum} \\ a_n = 0 & ow \end{Bmatrix}$$ (Eq. 10)

w is the width, h is the height of page $w_{e_{v,n}}, h_{e_{v,n}}$ are the width and height of visual element $e_{v,n}$, respectively. The function f measures information content of a document, (e.g., a visual importance measure e.g., entropy or saliency, etc., which are well-known in the art). In one embodiment, α equals 0.7 and β equals 0.3.

Figures

Figure size relative to the sum of sizes of the figures on the same page $$v_{v,i} = \frac{w_{e_{v,i}} h_{e_{v,i}}}{\sum_n a_n w_{e_{v,n}} h_{e_{v,n}}} \begin{Bmatrix} a_n = 1 & \text{page}(e_{v,n}) = \text{page}(e_{v,i}) \\ a_n = 0 & ow \end{Bmatrix}$$ (Eq. 11)

Other features that may be used to contribute to the computation of information content attributes for figures include figure complexity, figure reference (how many times it is referenced), and figure content (existence of face, buildings, etc.).

Summary of Information Attributes for One Embodiment

A summary of the information content attributes used in one embodiment are given below in Table 3.

TABLE 3

| Elements | | Information Attribute ($v_i$) |
|---|---|---|
| Title | Fixed | 1 |
| Sub Section N | Fixed | 1/40 |
| FIG. and FIG. caption N | FIG. size/X | 1/40 * (Eq 11) |
| Abstract | Fixed | 1/8-1/24 Show only the first 3 sentences Two diff imp values for two tasks |
| References | Fixed | 1/20 |
| FIG.-no caption* | FIG. size/X | 1/4 * (Eq 11) |
| Thumbnail of page N | 1/Page num + Page complexity | (Eq 10) |
| Author names | Fixed | 1/90 |
| Publication name | Fixed | 1/180 |
| Publication date | Fixed | 1/90 |
| Keyword | Fixed | 1/180 |
| Page number | Fixed | 1/180 |
| Number of pages | Fixed | 1/180 |

The above values may be used and then subsequently modified. For example, for a 15-20 sec mmnail of a 4 page document, a particular output may be expected. If the expected output does not match the output using these values, the information values may be modified.

An Example of an Optimizer

In one embodiment, in response to visual and audible information segments and other inputs such as the display size of the output device and the time span, T, which is the duration of final multimedia thumbnail, the optimizer performs an optimization algorithm.

The main function of the optimization algorithm is to first determine how many pages can be shown to the user, given each page is to be displayed on the display for predetermined period of time (e.g., 0.5 seconds), during the time span available.

In one embodiment, the optimizer then applies a linear packing/filling order approach in a manner well-known in the art to the sorted time attributes to select which figures will be included in the multimedia thumbnail. Still-image holding is applied to the selected figures of the document. During the occupation of the visual channel by image holding, the caption is "spoken" in the audio channel. After optimization, the optimizer re-orders the selected visual, audio and audiovisual segments with respect to the reading order.

Other optimizers may be used to maximize the joined communicated information in time span L and in the visual display of constrained size.

A Specific Optimizer Implementation

In one embodiment, the optimizer is designed such that, given information content (importance) and time attributes of document elements, and time constraints, it selects the best document elements to include in the summary.

More specifically, the problem statement may provided as follows: Given the time constraint T importance, $v_{v,i}$, and time attributes, $t_{v,i}$, for each visual element $e_{v,i}$ and information content, $v_{a,i}$, and time attributes, $t_{a,i}$, for each audible element $e_{a,i}$, the optimizer finds the visual and audio elements to be included in the thumbnail. For some document element $e_{v,i}$, an $e_{a,i}$ has to be included (this is for some audio that has to be synchronized with visual elements, such as figure captions with figures). Adding another set of elements, audiovisual elements, $e_{av,i}$, solves this and separates them from purely visual (e.g., thumbnail of pages) and purely audio (e.g., keyword) elements.

In one embodiment of the optimizer, an attempt is made to maximize the information content presented to the user by making maximum use of the time allowed for presentation. If the simplification of including the visual and audiovisual document elements first is made, and then overlaying the time occupied by visual elements with audible elements, then the optimization problem can be reduced to a '0-1 knapsack' problem. In this problem, an element can only be fully included or discarded as shown in R. L. Rivest, et al., Introduction to Algorithms, MIT Pres, MC-Graw-Hill, Cambridge Mass., 1997.

The following is an example for a specific optimizer implementation. Suppose the preprocessor extracted from a two page document the following elements with the following information and time attributes:

Title t=2, v=1 (t: time attribute, v:information attribute)
Figure1 t=4, v=1/8 (no caption)
Figure2 t=10, v=1/8 (with caption)
Abstract t=20, v=1/8
Keyword1 t=1 v=1/180
Keyword2 t=3 v=1/180
Keyword3 t=2 v=1/180

In one embodiment, the time constraint T=8.

In the first stage, visual (FIG. 1, Abstract) and audiovisual (Title and FIG. 2) are ordered with their v/t ratio:

Title (1/2), Figure1(1/32), Figure2 (1/80), Abstract (1/160)

Total time is equal to 8. First from the ordered list, the optimizer selects the title and Figure1 to include into the representation, giving a total time of 2+4=6. Since there is not an audiovisual or a visual element that can be fit into the remainder of the time (i.e. 8-6=2), then the optimizer moves to the second stage.

In the second stage, the audible elements (keywords) are ordered with their v/t ratio as follows: Keyword1 (1/180), Keyword3 (1/360), Keyword2 (1/540)

Now the time occupied by purely visual elements is computed: Time (Figure1)=4.

This time constraint is used to insert audio elements. From the ordered list, Keyword1 and Keyword3 are selected.

Therefore, the final multimedia thumbnail contains the following document elements: Title, Figure1,Keyword1 and Keyword3.

The 0-1 Knapsack Problem—Two Stage

In one embodiment, the goal of the optimizer is to maximize $$\sum_i x_{v,i} v_{v,i} + \sum_i x_{av,i} v_{av,i}$$

subject to $$\sum_i x_{v,i} t_{v,i} + \sum_i x_{av,i} t_{av,i} \le T$$

$$x_{v,i} \in \{0, 1\}$$

$$x_{av,i} \in \{0, 1\}$$

where
$v_{v,i}$: information content attribute of visual element i;
$v_{av,i}$: information content attribute of audiovisual element i;
$t_{v,i}$ time attribute of visual element i;
$t_{av,i}$: time attribute of audiovisual element i;
T: time constraint, multimedia thumbnail presentation duration.
$x_{v,i}, x_{av,i}$: inclusion variables to indicate whether a variable is included or not.

Next, the optimizer sorts the ratios $$\frac{v_{v,i}}{t_{v,i}} \text{ and } \frac{v_{av,i}}{t_{av,i}}$$

in descending order to form an ordered list $L=\{e_{l(0)}, \ldots, e_{l(N-1)}\}$. In one embodiment, the ordered list is created by repeating the following steps:

```
T_0=T
O={ } an empty list
i=0
while (T_0>0 and i<N) {
    while (t_{l(i)} >T_0 and i <N) i++
    if (i < N)
        add e_{l(i)} to the output list O
        T_0= T_0-t_{l(i)}
        i++
    }
}
```

After the list of visual and audiovisual document elements are identified, the optimizer determines the time required to present the visual elements as.

$$T_v = \sum_i x_{v,i} t_{v,i}, \begin{cases} x_{v,i} = 0 & e_{v,i} \notin O \\ x_{v,i} = 1 & e_{v,i} \in O \end{cases}$$

Figure 6:
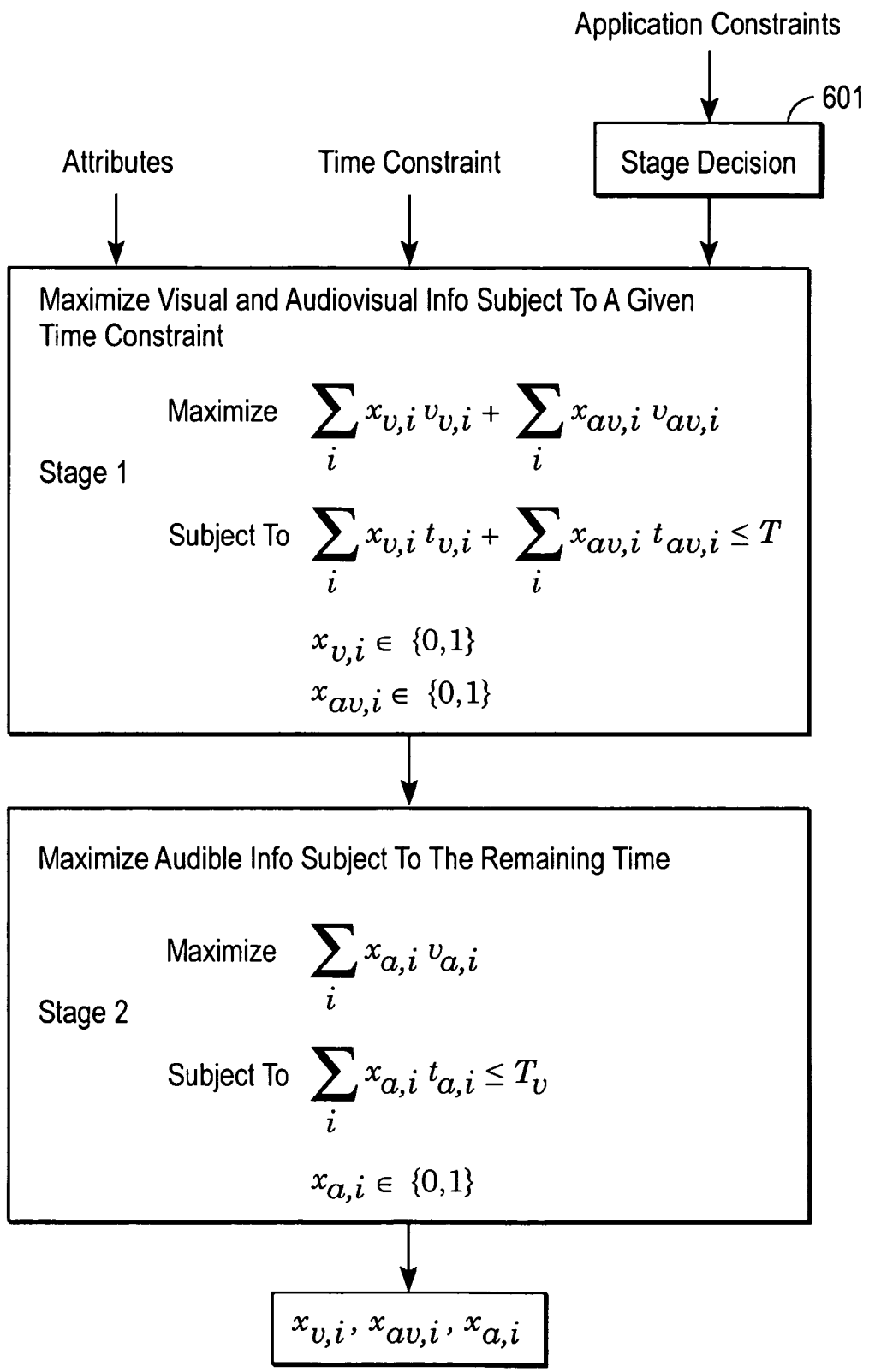
FIG. 6 illustrates an embodiment of a two-stage optimizer.

Then, the second stage of the optimization on the audible elements with the following constraints:

maximize $$\sum_i x_{a,i} v_{a,i}$$

subject to $$\sum_i x_{a,i} t_{a,i} \le T_v$$

$$x_{a,i} \in \{0, 1\}$$

where
$v_{a,i}$: information value attribute of audible element i; and
$t_{a,i}$: time attribute of audible element i.
$x_{a,j}$: inclusion variable Note that, in another embodiment, the combination of audible elements and audiovisual elements may be handled prior to the visual elements. The optimizer is responsive to an input that specifies whether the visual elements or the audible elements are to be handled first with the audiovisual elements. FIG. 6 shows such an example. Referring to FIG. 6, application constraints are an input used by a stage decision block 601 to determine which of the two stages to perform first. Such application constraints indicate which is more important, for example, the audio or visual. The first stage maximizes visual and audiovisual information and audiovisual information subject to a given time constraint, while the second stage maximizes audible information subject to the time remaining in the presentation time allocated to the multimedia representation. Thus, the stage decision block indicates which stage is to proceed first and which stage is to proceed second.

Figure 7:
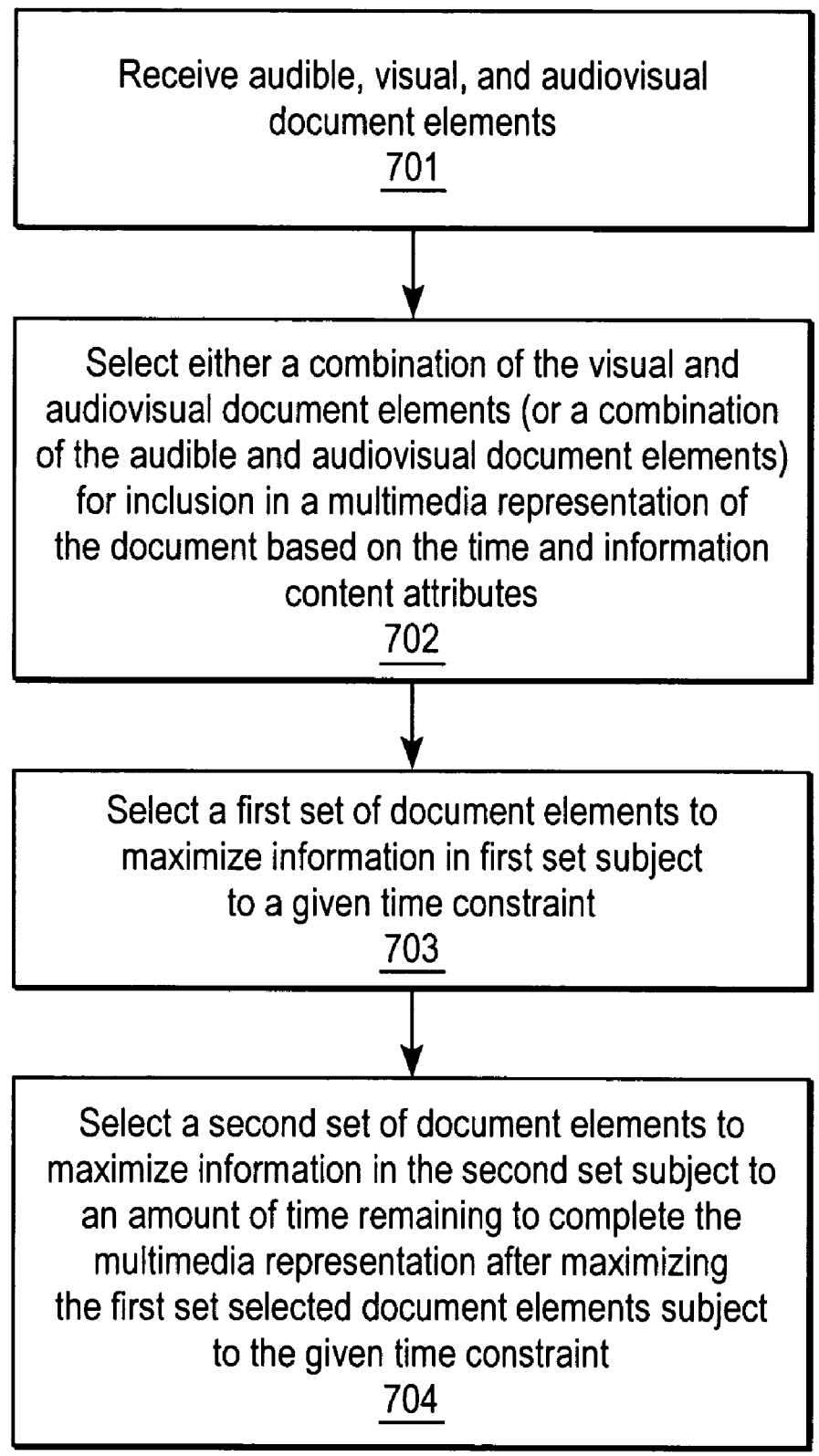
FIG. 7 is a flow diagram of one embodiment of a process for selecting document elements of a document.

FIG. 7 is a flow diagram of one embodiment of a process for selecting document elements of a document. The process is performed by processing logic that may comprise hardware (e.g., circuitry, dedicated logic, etc.), software (such as is run on a general purpose computer system or a dedicated machine), or a combination of both. The processing logic may be in the optimizer.

Referring to FIG. 7, the process begins by processing logic receiving audible, visual, and audiovisual document elements (processing block 701).

From the audible, visual, and audiovisual document elements, processing logic selects either a combination of the visual and audiovisual document elements or a combination of audible and audiovisual document elements for inclusion in a multimedia representation of the document based on the time and information content attributes (processing block 702). In one embodiment, processing logic selects either the combination of the visual and audiovisual document elements or the audible information based on an input that is based on one or more application constraints.

After selection, processing logic maximizes information in selected document elements subject to a given time constraint (processing block 703). In one embodiment, processing logic selects visual and audiovisual document elements to maximize the summation of the information content of the visual and audiovisual document elements while a summation of time attributes associated with selected visual and audiovisual elements is less than a presentation duration of the multimedia presentation. That is, processing logic selects a class of elements. Optionally, processing logic orders visual and audiovisual document elements or audible and audiovisual based on ratios of an information content attribute associated with the document element to a time attribute associated with the document element.

Thereafter, processing logic maximizes the second set of document elements subject to an amount of time remaining to complete the multimedia representation after maximizing the first selected set of document elements (processing block 704). In one embodiment, after the visual and audiovisual document elements are selected (if selected in favor of the audible document elements), processing logic selects audible elements for inclusion in the multimedia representation to maximize the summation of the information content of the audible document elements while a summation of time attributes associated with selected audible elements is less than a difference between a presentation duration of the multimedia presentation and the time to present the selected visual elements.

"Knapsack Problem" with Page Thumbnail Constraint

In one embodiment, in order to give user a better context and support easier navigation through the document, if there is a visual item to be shown on a page, then the thumbnail view for that page is included. Therefore, there should be a cost of adding an item of a page when that page was not added before. That cost accounts for adding a page thumbnail. Thus, a new constraint is added and is expressed as follows:

maximize $$\sum_i x_{v,i} v_{v,i} + \sum_i x_{av,i} v_{a,i}$$

subject to $$\sum_i x_{v,i} t_{v,i} + \sum_i x_{av,i} t_{av,i} \le T$$

$$x_{v,i} \in \{0, 1\}$$

$$x_{av,i} \in \{0, 1\}$$

where
$x_{v,j} = 1 \Rightarrow x_{v, argpage(e_{v,j})} = 1$
and
$x_{av,i} = 1 \Rightarrow x_{v, argpage(e_{av,i})} = 1$ where page($e_{v,i}$) is the element $e_{v,j}$ that contains the thumbnail of the page in which $e_{v,i}$ resides and page($e_{av,i}$) is the element $e_{v,j}$ that contains the thumbnail of the page in which $e_{av,i}$ resides.

The process is similar to above where processing logic sorts the ratios $$\frac{v_{v,i}}{t_{v,i}} \text{ and } \frac{v_{av,i}}{t_{av,i}}$$

in descending order to form an ordered list $L = \{e_{l(0)}, \ldots, e_{l(N-1)}\}$, with number of elements N. Then optimizer repeats the following steps:

```
T_0=T
O={ } an empty list
P={ } an empty list
TN={e_{v,n} ... } a list of visual elements that are thumbnails
t_{TN}=0.5
i=0
while (T_0>0 and i<N) {
```

-continued
```
addpage= e_{I(i)} ∉ TN and page(e_{I(i)}) ∉ P
while !(( addpage and (t_{I(i)} + t_{TN} ≤ T_0)) or (!addpage and
(t_{I(i)} ≤ T_0)) and (i < N)
    {
    i++
    if (i < N)
        addpage= e_{I(i)} ∉ TN and page(e_{I(i)}) ∉ P
    }
    }
    if (i < N)
        if (addpage)
            {
            add page=e_{I(i)} to P
            T_0 = T_0 - t_{I(i)} - t_{TN}
            add e_{v,j} = page(e_{I(i)}) to the output list O
            remove e_{v,j} = page(e_{I(i)}) from L
            N--
            }
        else
            {
            T_0 = T_0 - t_{I(i)}
            }
        add e_{I(i)} to the output list O
        i++
    }
}
```

Joint Optimization of Audio, Visual, and Audiovisual Elements—One Stage

If it is desired by the application that no priority of placement of visual or audio elements is given, then the optimization problem can be formulated as follows:

maximize $$\sum_i x_{v,i} v_{v,i} + \sum_i x_{av,i} v_{av,i} + \sum_i x_{a,i} v_{a,i}$$

subject to $$\sum_i x_{av,i} t_{av,i} + \max\left\{\sum_i x_{v,i} t_{v,i}, \sum_i x_{a,i} t_{a,i}\right\} \leq T$$

$$0 \leq x_{v,i} \leq 1$$

$$0 \leq x_{av,i} \leq 1$$

$$0 \leq x_{a,i} \leq 1$$

This problem is equivalent to:

maximize $$\sum_i x_{v,i} v_{v,i} + \sum_i x_{av,i} v_{av,i} + \sum_i x_{a,i} v_{a,i}$$

subject to $$\sum_i x_{av,i} t_{av,i} + \sum_i x_{v,i} t_{v,i} \leq T$$

$$\sum_i x_{av,i} t_{av,i} + \sum_i x_{a,i} t_{a,i} \leq T$$

$$0 \leq x_{v,i} \leq 1$$

$$0 \leq x_{av,i} \leq 1$$

$$0 \leq x_{a,i} \leq 1$$

In general, this is a linear program and therefore, a standard LP solver can be used, for example, in Matlab (http://www.mathworks/com) or in the CVSopt software package (http://www.ee.ucla.edu/~vandenbe/cvxopt/).

A time attribute $t_i$ of an element $e_i$ is split into two parts, $t_{ia}$ and $t_{ib}$, with $t_{ia} + t_{ib} = t_i$, where $t_{ia}$ represents the majority of the duration time $t_i$ and $t_{ib}$ a small remainder ($t_{ia} > t_{ib}$). The optimization problem is formulated in the following way:

Maximize $$\sum_i x_{v,ia} v_{v,i} + \sum_i x_{av,ia} v_{av,i} + \sum_i x_{a,ia} v_{a,i} +$$
$$\sum_i x_{v,ib} f(v_{v,i}) + \sum_i x_{av,ib} f(v_{av,i}) + \sum_i x_{a,ib} f(v_{a,i})$$

Subject to $$\sum_i x_{av,ia} t_{av,ia} + \max\left\{\sum_i x_{v,ia} t_{av,ia}, \sum_i x_{a,ia} t_{a,ia}\right\} + \sum_i x_{av,ib} t_{a,ib} +$$
$$\max\left\{\sum_i x_{v,ib} t_{av,ib}, \sum_i x_{a,ib} t_{a,ib}\right\} \leq T$$

$$0 \leq x_{v,ia} \leq 1$$
$$0 \leq x_{av,ia} \leq 1$$
$$0 \leq x_{a,ia} \leq 1$$
$$0 \leq x_{v,ib} \leq 1$$
$$0 \leq x_{av,ib} \leq 1$$
$$0 \leq x_{a,ib} \leq 1$$

where $f$ is $$f(v_{q,i}) = \alpha_{q,i} v_{q,i} \text{ with } \alpha_{q,i} = \frac{t_{q,ib}}{t_{q,ia}} \text{ or } \alpha_{q,i} = \frac{t_{q,ib}}{t_{q,i}}$$

for q=v, av, or a. The value $\alpha_{q,i}$ can also be chosen by the user or application as a constant $0 < \alpha_{q,i} < t_{ib}/t_{ia}$.

Splitting the time attribute in a dominant and a remainder part allows for more flexibility in the selection process for the document elements by allowing only a dominant, but not the complete part of the time duration for an element to be included into the final selection.

Synthesis

As discussed above, the optimizer receives the output from an analyzer, which includes the characterization of the visual and audible document information, and device characteristics, or one or more constraints (e.g., display size, available time span, user settings preference, and power capability of the device), and computes a combination of visual and audible information that meets the device constraints and utilizes the capacity of information deliverable through the available output visual and audio channels. In this way, the optimizer operates as a selector, or selection mechanism.

After selection, a synthesizer composes the final multimedia thumbnail. In one embodiment, the synthesizer composes the final multimedia thumbnail by executing selected multimedia processing steps determined in the optimizer. In one embodiment, the synthesizer receives a file, such as, for example, a plain text file or XML file, having the list of processing steps. In another embodiment, the list of processing steps may be sent to the synthesizer by some other means such as, for example, through socket communication or corn object communication between two software modules. In yet another embodiment, the list of processing steps is passed as function parameters if both modules are in the same software. The multimedia processing steps may include the "traditional" image processing steps crop, scale, and paste, but also steps including a time component such as page flipping, pan, zoom, and speech and music synthesis.

In one embodiment, the synthesizer comprises a visual synthesizer, an audio synthesizer, and a synthesizer/composer. The synthesizer uses the visual synthesis to synthesize the selected visual information into images and a sequence of images, the audio synthesizer to synthesize audible information into speech, and then the synchronizer/composer to synchronize the two output channels (audio and visual) and compose a multimedia thumbnail. Note that the audio portion of the audiovisual element is synthesized using the same speech synthesizer used to synthesize the audible information.

In one embodiment, for the visual composition including sequences of images (without audio) such as zoom and page flipping is performed using Adobe AfterEffects, while the synchronizer/composer uses Adobe Premier. In one embodiment, the audio synthesizer uses CMU speech synthesizing software (FestVox, http://festvox.org/voicedemos.html) to create sound for the audible information.

In one embodiment, the synthesizer does not include the synchronizer/composer. In such a case, the output of the synthesizer may be output as two separate streams, one for audio and one for visual.

The outputs of the synchronizer/composer may be combined into a single file and may be separate audio and video channels.

Applications

The techniques described herein may be potentially useful for a number of applications. For example, the techniques may be used for document browsing for devices, such as mobile devices and multi-function peripherals (MFPs).

For example, when performing interactive document browsing on a mobile device, the document browsing can be re-defined, for example, instead of zoom and scroll, operations may include, play, pause, fast forward, speedup, and slowdown.

In another mobile device application when performing document viewing and reviewing on mobile devices, the techniques set forth herein may be used to allow a longer version of the MMNail (e.g., 15 minutes long) to be used to provide not only an overview but also understand the content of a document. This application seems to be suitable for devices with limited imaging capabilities, but preferred audio capability, such as cell phones. After browsing and viewing a document with a mobile device, in one embodiment, the mobile device sends it to a device (e.g., an MFP) at another location to have the device perform other functions on the document (e.g., print the document).

In one MFP application, the techniques described herein may be used for document overview. For example, when a user is copying some documents at the MFP, as the pages are scanned, an automatically computed document overview may be displayed to the user, giving a person a head start in understanding the content of the document.

An image processing algorithm performing enhancement of the document image inside an MFP may detect regions of problematic quality, such as low contrast, small font, halftone screen with characteristics interfering with the scan resolution, etc. An MMNail may be displayed on the copier display (possibly without audio) in order to have the user evaluating the quality of the scanned document (i.e., the scan quality) and suggest different settings, e.g., higher contrast, higher resolution.

In a Translation Application, the language for the audio channel can be selected by the user and audible information may be presented in language of choice. In this case, the optimizer functions differently for different languages since the length of the audio would be different. That is, the optimizer results depend on the language. In one embodiment, visual document text is altered. The visual document portion can be re-rendered in a different language.

In one embodiment, the MMNail optimizations are computed on the fly, based on interactions provided by user. For example, if the user closes the audio channel, then other visual information may lead to different visual representation to accommodate this loss of information channel. In another example, if the user slows downs the visual channel (e.g., while driving a car), information delivered through the audio channel may be altered. Also, animation effects such as, for example, zoom and pan, may be available based on the computational constraints of the viewing device.

In one embodiment, the MMnails are used to assist disabled people in perceiving document information. For example, visual impaired people may want to have small text in the form of audible information. In another example, color blind people may want some information on colors in a document be available as audible information in the audio channel.

An Example of a Computer System

Figure 8:
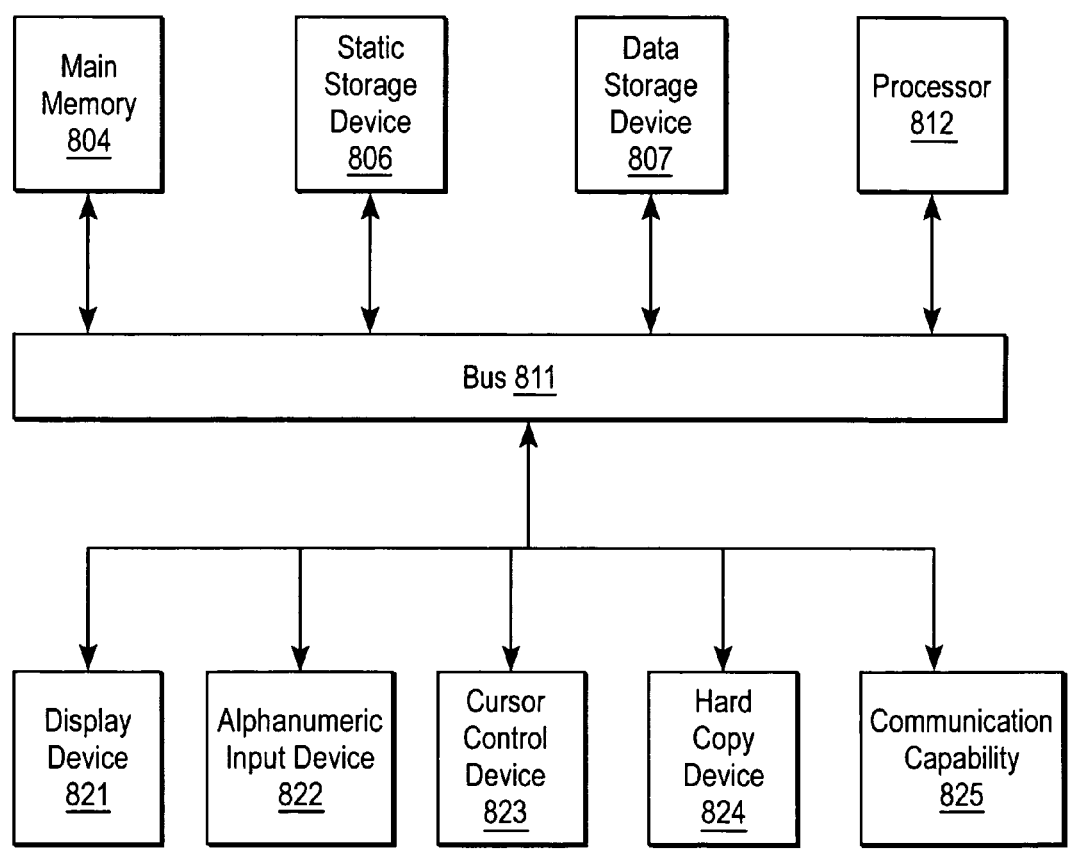
FIG. 8 is a block diagram of one embodiment of a computer system.

FIG. 8 is a block diagram of an exemplary computer system that may perform one or more of the operations described herein. Referring to FIG. 8, computer system 800 may comprise an exemplary client or server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium Processor, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device. Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving audible, visual, and audiovisual document elements;
   computing time attributes associated with the audible, visual, and audiovisual document elements based on display constraints and a time to present each of the audible, visual, and audiovisual document elements, wherein the time for a visual or audiovisual document element is computed based on an estimated time for a user to comprehend the visual or audiovisual document element;
   computing information content attributes associated with the audible, visual, and audiovisual document elements based on display constraints;
   selecting, with a processor, a set of one or more of the audible, visual and audiovisual document elements for inclusion into a multimedia representation based on the time and information content attributes.

2. The method defined in claim 1 wherein computing the information content attributes is based on one or more of an application and user specific constraints.

3. The method defined in claim 1 wherein one visual document element comprises a visual text element, and wherein computing time attributes comprises computing a time attribute for the visual text element by:
   computing a zoom parameter;
   determining any necessary pan operations; and
   determining a time required to perform the pan and zoom operations.

4. The method defined in claim 3 wherein the zoom parameter is for readability.

5. The method defined in claim 3 wherein the zoom operation causes zooming to transition from an unreadable resolution to a readable resolution.

6. The method defined in claim 1 further comprises composing the multimedia representation using the set of one or more of the audible, visual and audiovisual document elements.

7. The method defined in claim 6 wherein composing the multimedia representation using the set of one or more of the audible, visual and audiovisual document elements comprises outputting a navigation path representation by which the set of one or more of the audible, visual and audiovisual document elements are processed when creating the multimedia representation.

8. The method defined in claim 1 further comprising reordering the set of the audible, visual and audiovisual document elements in reading order.

9. The method defined in claim 1 wherein selecting a set of one or more of the audible, visual and audiovisual document elements based on the time and information content attributes comprises:
   selecting either a combination of the visual and audiovisual information or a combination of audible and audiovisual information;
   selecting a first set of document elements to maximize information contained in first set subject to a given time constraint; and
   selecting a second set of document elements to maximize information contained in the second set subject to an amount of time remaining to complete the multimedia representation after maximizing the selected document elements.

10. The method defined in claim 9 wherein selecting either combination is performed in response to an input from one or more of an application and a user.

11. The method defined in claim 9 wherein selection of either the combination of audible and audiovisual information or visual and audiovisual information is based on an input that is based on one or more application constraints.

12. The method defined in claim 9 wherein maximizing selected document elements is subject to a page thumbnail constraint.

13. The method defined in claim 1 wherein the display constraint is display size of a device for which the multimedia presentation is being generated.

14. The method defined in claim 1 further comprising splitting a time attribute associated with a selected document element to enable the selected document element to fit within a display width.

15. The method defined in claim 14 wherein a point at which the time attribute is split is chosen by one or both of a user and an application.

16. A method comprising:
   receiving audible, visual, and audiovisual document elements;
   computing time attributes associated with the audible, visual, and audiovisual document elements based on display constraints and a time to present each of the audible, visual, and audiovisual document elements, wherein computing the time attribute for the visual text element further comprises
   determining readability of the visual text element for a first view based on display constraints and document information, and
   setting the time attribute equal to a product of a speech synthesis constant and a number of characters in the visual text element if the visual text element is determined to be readable;
   computing information content attributes associated with the audible, visual, and audiovisual document elements based on display constraints;
   selecting, with a processor, a set of one or more of the audible, visual and audiovisual document elements for inclusion into a multimedia representation based on the time and information content attributes.

17. The method defined in claim 16 wherein determining readability is based on one or more of an application and user specific constraints.

18. The method defined in claim 16 further comprising, if not readable in the first view:
   determining readability of the visual text element in a zoom view, and
   setting the time attribute equal to a product of a speech synthesis constant and a number of characters in the visual text element plus a constant indicative of a time necessary to zoom to a title in the visual text element in the zoom view if readable in the zoom view.

19. The method defined in claim 18 further comprising, if not readable in the first or zoom view:
   computing a zoom factor indicative of an amount of zooming that is necessary for readability of text in the visual text element,
   determining a time required for panning; and
   setting the time attribute based on a time necessary to zoom to text in the visual text element in the zoom view and pan over text element.

20. The method defined in claim 16 wherein the first view comprises a thumbnail view.

21. The method defined in claim 16 wherein the display constraints comprise display width and display height and the document information is based on page width and page height.

22. A method comprising:
   receiving audible, visual, and audiovisual document elements;
   computing time attributes associated with the audible, visual, and audiovisual document elements based on display constraints and a time to present each of the audible, visual, and audiovisual document elements, wherein one audiovisual document element comprises an audiovisual element having a text portion, and wherein computing time attributes comprises computing a time attribute for the audiovisual element as a maximum of the time required to visually navigate the text portion of the audiovisual element and the time required to play back synthesized text associated with the audiovisual element;
   computing information content attributes associated with the audible, visual, and audiovisual document elements based on display constraints;
   selecting, with a processor, a set of one or more of the audible, visual and audiovisual document elements for inclusion into a multimedia representation based on the time and information content attributes.

23. A method comprising:
   receiving audible, visual, and audiovisual document elements;
   computing time attributes associated with the audible, visual, and audiovisual document elements based on display constraints and a time to present each of the audible, visual, and audiovisual document elements, wherein one audiovisual document element comprises an audiovisual element having a figure portion, and wherein computing time attributes comprises computing a time attribute for the audiovisual element as a maximum of the time required to visually comprehend the figure portion of the audiovisual element and the time required to play back synthesized text associated with the audiovisual element;
   computing information content attributes associated with the audible, visual, and audiovisual document elements based on display constraints;
   selecting, with a processor, a set of one or more of the audible, visual and audiovisual document elements for inclusion into a multimedia representation based on the time and information content attributes.

24. An article of manufacture having one or more recordable media with instructions thereon which, when executed by a system, cause the system to perform a method comprising:
   receiving audible, visual, and audiovisual document elements; and
   selecting a set of one or more of the audible, visual and audiovisual document elements for inclusion into a multimedia representation based on the time and information content attributes computed based on display and time constraints and at least one of application and user specific inputs, the computed time attributes include at least a time to present each of the audible, visual, and audiovisual document elements, wherein the time for a visual or audiovisual document element is computed based on an estimated time for a user to comprehend the visual or audiovisual document element.

25. The article of manufacture defined in claim 24 wherein selecting the set of one or more of the audible, visual and audiovisual document elements comprises:
   computing the time attributes associated with the audible, visual, and audiovisual document elements based on display and at least one application and user specific constraints; and
   computing the information content attributes associated with the audible, visual, and audiovisual document elements based on display and application constraints.

26. The article of manufacture defined in claim 24 wherein selecting the set of one or more of the audible, visual and audiovisual document elements comprises:
   composing the multimedia representation using the set of one or more of the audible, visual and audiovisual document elements.

27. An apparatus comprising:
   an input to receive audible, visual, and audiovisual document elements; and
   a selector to select a set of one or more of the audible, visual and audiovisual document elements for inclusion into a multimedia representation based on the time and information content attributes computed based on display and time constraints and at least one of application and user constraints, the computed time attributes include at least a time to present each of the audible, visual, and audiovisual document elements, wherein the time for a visual or audiovisual document element is computed based on an estimated time for a user to comprehend the visual or audiovisual document element.

28. The apparatus defined in claim 27 wherein the multimedia representation generator composes the multimedia representation using the set of one or more of the audible, visual and audiovisual document elements.

29. A method comprising:
   receiving audible, visual, and audiovisual document elements;
   selecting, with a processor, either a combination of the visual and audiovisual document elements or a combination of the audible and audiovisual document elements for inclusion in a multimedia representation of the document based on the time and information content attributes, the time attributes include at least a time to present each of the audible, visual, and audiovisual document elements, wherein the time for a visual or audiovisual document element is based on an estimated time for a user to comprehend the visual or audiovisual document element;

selecting a first set to maximize information contained in set subject to a given time constraint; and selecting a second set to maximize information contained in set subject to an amount of time remaining to complete the multimedia representation after maximizing the selected document elements.

30. The method defined in claim 29 wherein selection of either the combination or the audible information is based on an input that is based on one or more application constraints.

31. The method defined in claim 29 wherein maximizing selected document elements is subject to a page thumbnail constraint.

32. The method defined in claim 29 further comprising ordering visual and audiovisual document elements based on ratios of an information content attribute associated with the document element to a time attribute associated with the document element, and wherein selecting either the combination of the visual and audiovisual document elements or the audible document elements for inclusion in the multimedia representation comprises selecting visual and audiovisual document elements to maximize the summation of the information content of the visual and audiovisual document elements while a summation of time attributes associated with selected visual and audiovisual elements is less than a presentation duration of the multimedia presentation.

33. A method comprising:

receiving audible, visual, and audiovisual document elements;

selecting, with a processor, either a combination of the visual and audiovisual document elements or a combination of the audible and audiovisual document elements for inclusion in a multimedia representation of the document based on the time and information content attributes, the time attributes include at least a time to present each of the audible, visual, and audiovisual document elements, wherein selecting either the combination of the visual and audiovisual document elements or the audible document elements for inclusion in a multimedia representation further comprises selecting audible elements for inclusion in the multimedia representation to maximize the summation of the information content of the audible document elements while a summation of time attributes associated with selected audible elements is less than a difference between a presentation duration of the multimedia presentation and the time to present the selected visual elements;

selecting a first set to maximize information contained in set subject to a given time constraint; and selecting a second set to maximize information contained in set subject to an amount of time remaining to complete the multimedia representation after maximizing the selected document elements; and ordering visual and audiovisual document elements based on ratios of an information content attribute associated with the document element to a time attribute associated with the document element, and wherein selecting either the combination of the visual and audiovisual document elements or the audible document elements for inclusion in the multimedia representation comprises selecting visual and audiovisual document elements to maximize the summation of the information content of the visual and audiovisual document elements while a summation of time attributes associated with selected visual and audiovisual elements is less than a presentation duration of the multimedia presentation.

34. An article of manufacture having one or more recordable media with instructions thereon which, when executed by a system, cause the system to perform a method comprising:

receiving audible, visual, and audiovisual document elements;

selecting either a combination of the visual and audiovisual document elements or the audible document elements for inclusion in a multimedia representation of the document based on the time and information content attributes, the time attributes include at least a time to present each of the audible, visual, and audiovisual document elements, wherein the time for a visual or audiovisual document element is based on an estimated time for a user to comprehend the visual or audiovisual document element;

selecting a first set of document elements with respect to maximizing information contained in first set subject to a given time constraint; and selecting a second set of document elements with respect to maximizing information contained in the second set subject to an amount of time remaining to complete the multimedia representation after maximizing the selected document elements.

\* \* \* \* \*